(12) United States Patent
Park

(10) Patent No.: US 10,396,960 B2
(45) Date of Patent: Aug. 27, 2019

(54) METHOD FOR TRANSMITTING CONTROL INFORMATION ON TRANSMISSION POINTS AND CORRESPONDING TRANSMISSION POINT, AS WELL AS METHOD FOR MAPPING UPLINK CONTROL CHANNEL RESOURCE OF TERMINAL AND CORRESPONDING TERMINAL

(71) Applicant: KT CORPORATION, Gyeonggi-do (KR)

(72) Inventor: Kyujin Park, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 223 days.

(21) Appl. No.: 14/419,530

(22) PCT Filed: Jul. 30, 2013

(86) PCT No.: PCT/KR2013/006815
§ 371 (c)(1),
(2) Date: Feb. 4, 2015

(87) PCT Pub. No.: WO2014/025150
PCT Pub. Date: Feb. 13, 2014

(65) Prior Publication Data
US 2015/0208391 A1    Jul. 23, 2015

(30) Foreign Application Priority Data

Aug. 6, 2012  (KR) .......................... 10-2012-0085937
Aug. 16, 2012 (KR) .......................... 10-2012-0089253
(Continued)

(51) Int. Cl.
*H04L 5/00* (2006.01)
*H04W 72/04* (2009.01)
*H04L 1/18* (2006.01)

(52) U.S. Cl.
CPC .......... *H04L 5/0055* (2013.01); *H04W 72/042* (2013.01); *H04W 72/0446* (2013.01); *H04L 1/1854* (2013.01)

(58) Field of Classification Search
CPC ........... H04W 72/042; H04W 72/0446; H04W 72/04; H04W 88/02; H04W 72/0406;
(Continued)

(56) References Cited

U.S. PATENT DOCUMENTS 9,198,181 B2    11/2015  Blankenship et al.
9,312,993 B2 *   4/2016  Seo .......................... H04L 5/001
(Continued)

FOREIGN PATENT DOCUMENTS

KR    10-2011-0117012 A    10/2011

OTHER PUBLICATIONS

3GPP TSG-RAN WG1 #69 Necessity of Multiplexing of Localized and Distributed ePDCCH Parts in the Same PRBs, May 21-May 25, 2013 MediaTek.*
(Continued)

*Primary Examiner* — Michael J Moore, Jr.
(74) *Attorney, Agent, or Firm* — IP Legal Services, LLC

(57) ABSTRACT

The present disclosure relates to a method and apparatus for transmitting uplink control information for a terminal. That is, the method and apparatus may be provided for transmitting downlink control information through a downlink control channel which is introduced into a data domain and receiving control information. More particularly, a method and apparatus may be provided for mapping an uplink control channel resource for feeding back uplink HARQ ACK/NACK of the terminal for a downlink data channel through downlink scheduling information, which is transmitted via the downlink control channel.

11 Claims, 12 Drawing Sheets

(30) Foreign Application Priority Data

| | | |
|---|---|---|
| Aug. 17, 2012 | (KR) | 10-2012-0089881 |
| Aug. 24, 2012 | (KR) | 10-2012-0093098 |
| Aug. 24, 2012 | (KR) | 10-2012-0093109 |
| Nov. 22, 2012 | (KR) | 10-2012-0132928 |
| Dec. 13, 2012 | (KR) | 10-2012-0145416 |
| Dec. 14, 2012 | (KR) | 10-2012-0146706 |

(58) Field of Classification Search
  CPC .......... H04W 72/1289; H04W 72/044; H04L 5/0048; H04L 5/0053; H04L 5/0055; H04L 1/1812
  See application file for complete search history.

(56) References Cited

U.S. PATENT DOCUMENTS

| | | | |
|---|---|---|---|
| 9,497,752 B2* | 11/2016 | Seo | H04W 72/042 |
| 9,655,087 B2* | 5/2017 | Park | H04W 72/0413 |
| 2012/0300722 A1* | 11/2012 | Kim | H04L 1/1861 370/329 |
| 2012/0320846 A1 | 12/2012 | Papasakellariou et al. | |
| 2013/0028219 A1 | 1/2013 | Lee et al. | |
| 2013/0039291 A1* | 2/2013 | Blankenship | H04L 5/001 370/329 |
| 2013/0114530 A1 | 5/2013 | Chen et al. | |
| 2013/0188566 A1* | 7/2013 | Zhu | H04W 72/042 370/329 |
| 2013/0194931 A1* | 8/2013 | Lee | H04L 5/0053 370/241 |
| 2013/0215842 A1 | 8/2013 | Han et al. | |
| 2013/0229997 A1 | 9/2013 | Lunttila et al. | |
| 2013/0230017 A1 | 9/2013 | Papasakellariou et al. | |
| 2013/0242890 A1* | 9/2013 | He | H04W 72/0413 370/329 |
| 2013/0301562 A1* | 11/2013 | Liao | H04W 72/042 370/329 |
| 2013/0322352 A1 | 12/2013 | Han et al. | |
| 2014/0003375 A1 | 1/2014 | Nam et al. | |
| 2014/0036810 A1* | 2/2014 | Harrison | H04W 72/042 370/329 |
| 2014/0078980 A1 | 3/2014 | Frenne et al. | |
| 2015/0110022 A1* | 4/2015 | Liu | H04L 1/1861 370/329 |
| 2015/0131565 A1* | 5/2015 | Nakashima | H04L 1/0026 370/329 |
| 2015/0195069 A1* | 7/2015 | Yi | H04W 4/70 370/329 |
| 2015/0257150 A1* | 9/2015 | Yi | H04B 7/26 370/329 |

OTHER PUBLICATIONS

3GPP TSG-RAN WG1 #68bis PUCCH resource allocation in response to E-PDCCH Mar. 2012 Pantech.*
Panasonic, "Definitions of eREG and eCCE", R1-122201, 3GPP TSG RAN WG1 Meeting #69, Prague, Czech Republic, May 21-25, 2012, pp. 1-4.
LG Electronics, "On ePDCCH Search Space Design Supporting Localized and Distributed Transmission", R1-122309, 3GPP TSG RAN WG1 Meeting #69, Prague, Czech Republic, May 21-25, 2012, pp. 1-11.
Mediatek Inc., "Physical Structure of ePDCCH and Its Mulitplexing with PDSCH", R1-120629, 3GPP TSG RAN WG1 #68, Dresden, Germany, Feb. 6-10, 2012, pp. 1-3.
Korean Intellectual Property Office, International Search Report for International Application No. PCT/KR2013/005959, dated Oct. 22, 2013.
Korean Intellectual Property Office, Written Opinion of the International Searching Authority for International Application No. PCT/KR2013/005959, dated Oct. 22, 2013.
Samsung, "Multiplexing Distributed and Localized ePDCCHs", R1-122256, 3GPP TSG RAN WG1 #69, Prague, Czech Republic, May 21-25, 2012, pp. 1-5.
Pantech, "PUCCH resource allocation in response to E-PDCCH", R1-121367, 3GPP TSG RAN WG1 #68bis, Jeju, Korea, Mar. 26-30, 2012, pp. 1-2.
Nokia Siemens Networks et al., "HARQ-ACK resource allocation for data scheduled via ePDCCH", R1-122428, 3GPP TSG RAN WG1 Meeting #69, Prague, Czech Republic, May 21-25, 2012, pp. 1-2.
Korean Intellectual Property Office, International Search Report for International Application No. PCT/KR2013/006757, dated Nov. 12, 2013.
Korean Intellectual Property Office, Written Opinion of the International Searching Authority for International Application No. PCT/KR2013/006757, dated Nov. 12, 2013.
Samsung, "HARQ-ACK PUCCH Resources in Response to ePDCCH Detections", R1-122259, 3GPP TSG RAN WG1 #69, Prague, Czech Republic, May 21-25, 2012, pp. 1-2.
Mediatek Inc., "Necessity of Multiplexing of Localized and Distributed ePDCCH Parts in the Same PRBs", R1-122168, 3GPP TSG RAN WG1 #69, Prague, Czech Republic, May 21-25, 2012, pp. 1-3.
LG Electronics, "Discussion on PUCCH Resource for ePDCCH", R1-122314, 3GPP TSG RAN WG1 #69, Prague, Czech Republic, May 21-25, 2012, pp. 1-2.
Pantech, "PUCCH resource allocation in response to E-PDCCH", R1-122456, 3GPP TSG RAN WG1 #69, Prague, Czech Republic, May 21-25, 2012, pp. 1-3.
Asustek, "PUCCH Resource Allocation Corresponding to ePDCCH", R1-122614, 3GPP TSG RAN WG1 #69, Prague, Czech Republic, May 21-25, 2012, pp. 1-2.

* cited by examiner

METHOD FOR TRANSMITTING CONTROL INFORMATION ON TRANSMISSION POINTS AND CORRESPONDING TRANSMISSION POINT, AS WELL AS METHOD FOR MAPPING UPLINK CONTROL CHANNEL RESOURCE OF TERMINAL AND CORRESPONDING TERMINAL

CROSS REFERENCE TO RELATED APPLICATIONS

This application is a National Stage Patent Application of PCT International Patent Application No. PCT/KR2013/006815 (filed on Jul. 30, 2013) under 35 U.S.C. § 371, which claims priority to Korean Patent Application Nos. 10-2012-0085937 (filed on Aug. 6, 2012), 10-2012-0089253 (filed on Aug. 16, 2012), 10-2012-0089881 (filed on Aug. 17, 2012), 10-2012-0093098 (filed on Aug. 24, 2012), 10-2012-0093109 (filed on Aug. 24, 2012), 10-2012-0132928 (filed on Nov. 22, 2012), 10-2012-0145416 (filed on Dec. 13, 2012), and 10-2012-0146706 (filed on Dec. 14, 2012), the teachings of which are incorporated herein in their entireties by reference.

TECHNICAL FIELD

The present disclosure relates to a method and apparatus for transmitting downlink control information through a downlink control channel introduced to a data region and transmitting uplink control information for a User Equipment (UE) that receives the downlink control information, and more particularly, to an uplink control channel resource mapping method and apparatus for uplink HARQ ACK/NACK feedback of a UE with respect to a downlink control channel, through downlink scheduling information transmitted through a downlink control channel.

BACKGROUND ART

A wireless communication system is designed to transmit data to a large number of users. However, there are limits on increasing system capacity due to limited control region resources. In order to increase the capacity, downlink control information is transmitted through a downlink control channel located in a data region.

For increasing the capacity of the downlink control channel, it is required to define an uplink control channel resource mapping method for an uplink HARQ ACK/NACK feedback of a UE that receives downlink scheduling information through a new downlink control channel that is newly introduced to a data region.

DETAILED DESCRIPTION OF THE INVENTION

Technical Solution

In this background, an aspect of the present specification is to provide a control information transmitting method of a Transmission/Reception (T/R) point in a wireless communication system and the T/R point, and an uplink control channel resource mapping method of a User Equipment (UE) and the UE.

In accordance with an aspect of the present disclosure, there is provided a control information transmission method of a transmission/reception point for transmitting control information with respect to a User Equipment (UE) through a data region of a resource block pair (Physical Resource Block pair) of a subframe. The method may include: allocating at least one of downlink control channel sets each formed of X resource block pairs of the subframe, where the at least one downlink control channel includes an Enhance Physical Downlink Control Channel and the X is a natural number greater than or equal to 1 and less than or equal to a number of resource blocks (RBs) in the entire band; transmitting, to the UE, uplink control channel resource starting offset indication information for each of the at least one of downlink control channel sets; and transmitting, to the UE, the control information through at least one control channel element indexed for each downlink control channel set.

In accordance with another aspect of the present disclosure, there is provided an uplink control channel resource mapping method of a UE. the method may include: receiving, from a transmission/reception point, uplink control channel resource starting offset indication information for each of at least one downlink control channel set formed of X resource block pairs of a subframe, where the downlink control channel includes an Enhanced Physical Downlink Control Channel and X is a natural number greater than or equal to 1 and less than or equal to the number of resource blocks (RBs); receiving, from a transmission/reception point, control information associated with downlink scheduling information through at least one control channel element indexed for each downlink control channel set, where the control channel element includes an Enhanced Control Channel Element; and executing uplink control channel resource mapping for ACK/NACK with respect to a (Physical Downlink Shared Channel (PDSCH) allocated based on the downlink scheduling information, using the uplink control channel resource starting offset indication information and the lowest index of the control channel element as components for resource determination. In accordance with another aspect of the present disclosure, there is provided a transmission/reception point that transmits control information with respect to a UE through a data region of a resource block pair (Physical Resource Block pair) of a subframe. The transmission/reception point may include a controller and a transmitter. The controller may be configured to allocate at least one downlink control channel set formed of X resource block pairs of the subframe, where the downlink control channel includes an Enhanced Physical Downlink Control Channel and X is a natural number greater than or equal to 1 and less than or equal to the number of RBs in the entire band. The transmitter may be configured to transmit, to the UE, uplink control channel resource starting offset indication information for each of the at least one downlink control channel set, and to transmit, to the UE, the control information through at least one control channel element indexed for each downlink control channel set, where the control channel element includes an Enhanced Control Channel Elements.

In accordance with another aspect of the present disclosure, there is provided a UE. The UE may include a receiver and a controller. The receiver may be configured to receive, from a transmission/reception point, uplink control channel resource starting offset indication information for each of at least one downlink control channel set formed of X resource block pairs of a subframe, where the downlink control channel include an Enhanced Physical Downlink Control Channel and X is a natural number greater than or equal to 1 and less than or equal to the number of RBs in the entire band, and to receive, from a transmission/reception point, control information associated with downlink scheduling information through at least one control channel element indexed for each downlink control channel set, where the control channel element includes an Enhanced Control Channel Element. The controller may be configured to perform uplink control channel resource mapping for ACK/NACK with respect to Physical Downlink Shared Channel (PDSCH) allocated based on the downlink scheduling information, using the uplink control channel resource starting offset indication information and the lowest index of the control channel element as components for resource determination.

A control information transmitting method of a Transmission/Reception (T/R) point and the T/R point, and an uplink control channel resource mapping method of a User Equipment (UE) and the UE, provided in a wireless communication system according to embodiments, are effective for transmitting downlink control information through a downlink control channel and for transmitting uplink control information for the UE that receives the downlink control information.

MODE FOR CARRYING OUT THE INVENTION

Figure 1:
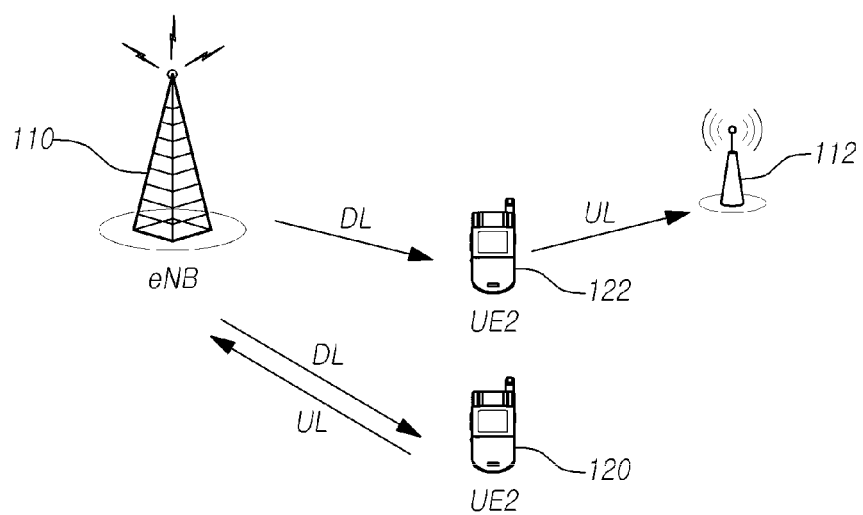
FIG. 1 illustrates a wireless communication system according to embodiments.

Hereinafter, embodiments of the present disclosure will be described with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

The wireless communication system may be widely installed so as to provide various communication services, such as a voice service, packet data, and the like. The wireless communication system may include a User Equipment (UE) and a Transmission/Reception point (T/P). Throughout the specifications, the UE may be an inclusive concept indicating a terminal utilized in wireless communication, including a User Equipment (UE) in wideband code division multiple access (WCDMA), long term evolution (LTE), high speed packet access (HSPA), and the like, and an Mobile station (MS), a User Terminal (UT), an Subscriber Station (SS), a wireless device, and the like in GSM.

A transmission/reception (T/R) point may generally refer to a station communicating with a UE. The T/R point may be referred to as a Base Station (BS) or a cell, a Node-B, an evolved Node-B (eNB), a Sector, a Site, a Base Transceiver System (BTS), an Access Point, a Relay Node, an Remote Radio Head (RRH), an Radio Unit (RU), and the like.

That is, in the specification, the base station or the cell may be construed to be an inclusive concept indicating a portion of an area or function covered by a Base Station Controller (BSC) in code division multiple access (CDMA), a NodeB in wideband code division multiple access (WCDMA), an eNodeB (eNB) or a sector (site) in long term evolution (LTE), and the like. This concept may include various coverage areas, such as a megacell, a macrocell, a microcell, a picocell, a femtocell, a communication range of a relay node, an RRH, and an RU, and the like.

In the specifications, the UE and the T/R point are used as two inclusive transceiving subjects to embody the technology and technical concepts described in the specifications, and may not be limited to a predetermined term or word. The UE and the T/R point are used as two inclusive transceiving subjects (Uplink and Downlink) to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like. An embodiment of the present disclosure may be applicable to resource allocation in an asynchronous wireless communication scheme that is advanced through global system for mobile (GSM), WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields to which the technical idea of the present disclosure is applicable.

Uplink transmission and downlink transmission may be performed based on a Time Division Duplex (TDD) scheme that performs transmission based on different times, or based on a Frequency Division Duplex (FDD) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a Physical Downlink Control Channel (PDCCH), Physical Control Format Indicator Channel (PCFICH), Physical Hybrid ARQ Indicator Channel (PHICH), Physical Uplink Control Channel (PUCCH), and the like, and may be configured as a data channel, such as Physical Downlink Shared Channel (PDSCH), Physical Uplink Shared Channel (PUSCH), and the like, so as to transmit data.

In the present specification, a cell may refer to the coverage of a signal transmitted from a Transmission/Reception (T/R) point, a component carrier having the coverage of the signal transmitted from the T/R point (transmission point or transmission/reception point), or the T/R point itself. FIG. 1 illustrates a wireless communication system according to embodiments.

Referring to FIG. 1, a wireless communication system 100 according to embodiments refers to a Coordinated Multi-point transmission/reception (COMP) system where two or more T/R points cooperatively transmit a signal, a coordinated multi-antenna transmission system, or a coordinated multi-cell communication system. The CoMP system 100 may include at least two of T/R points 110 and 112 and User Equipments (UEs) 120 and 122.

A T/R point may be a base station, a macro cell (hereinafter, referred to as an 'eNB' 110), or at least one RRH 112. The at least one RRH 112 is connected to the eNB 110 through an optical cable or an optical fiber, is wiredly controlled, and has one of high transmission power and low transmission power within a macrocell. The eNB 110 and the RRH 112 may have identical cell IDs or different cell IDs.

Hereinafter, a downlink refers to communication or a communication path from the T/R point 110 and 112 to the UE 120. An uplink refers to communication or a communication path from the UE 120 to the T/R point 110 and 112. In the downlink, a transmitter may be a part of the T/R point 110 and 112, and a receiver may be a part of the UE 120 and 122. In the uplink, a transmitter may be a part of the UE 120, and a receiver may be a part of the T/R point 110 and 112.

Hereinafter, transmission and reception of a signal through a PUCCH, a PUSCH, a PDCCH, a PDSCH, or the like may be described as "a PUCCH, a PUSCH, a PDCCH, or a PDSCH is transmitted or received".

Figure 2:
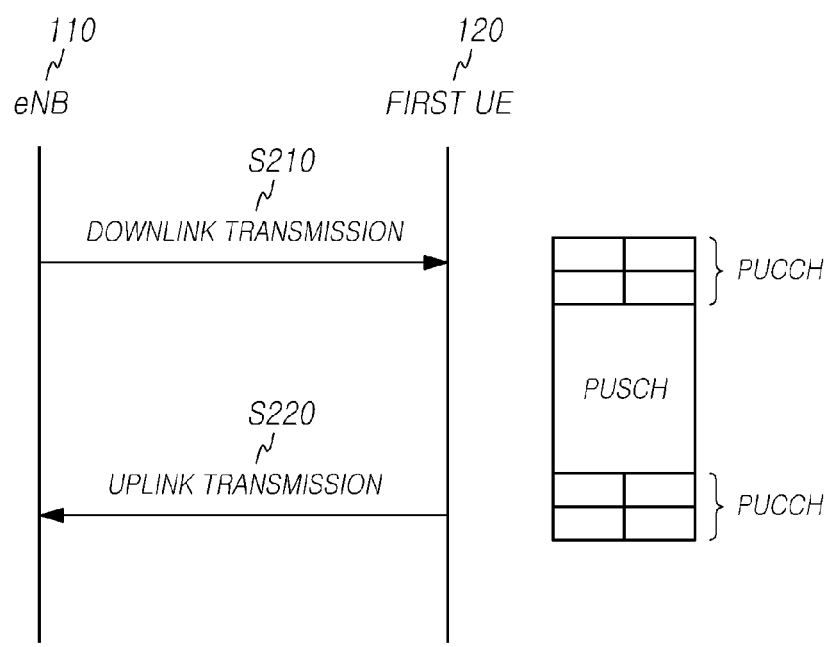
FIG. 2 and FIG. 3 are flowcharts illustrating downlink transmission and uplink transmission in a wireless communication system of FIG. 1.
Figure 3:
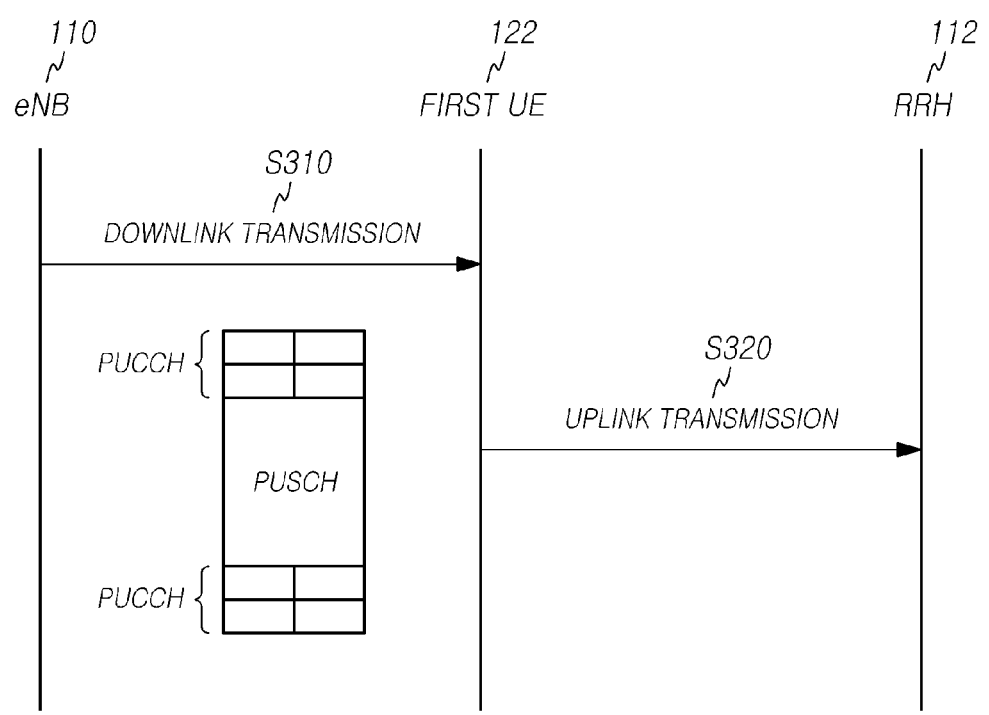

FIG. 2 is a flowchart illustrating downlink transmission and FIG. 3 is a flowchart illustrating uplink transmission in a wireless communication system of FIG. 1.

Referring to FIG. 2 and FIG. 3, the eNB 110 (e.g., a first T/R point which is one of the T/R points 110 and 112) may perform downlink transmission to UEs 120 and 122 in operations S210 and S310. The eNB 110 may transmit a Physical Downlink Shared Channel (PDSCH) which is the primary physical channel for unicast transmission. The eNB 110 may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). In the following description, signal transmission or reception through each channel is expressed as transmission or reception of the channel itself.

Referring to FIG. 2, a first UE (UE1) 120 may perform uplink transmission S220 to the eNB 110 which is the first T/R point. Referring to FIG. 3, a second UE (UE2) 122 may perform uplink transmission S320 to the RRH 112, that is, a second T/R point which is one of the T/R points 110 and 112. Conversely, depending on the wireless environment, the first UE 120 may perform uplink transmission to the RRH 112, and the second UE 122 may perform uplink transmission to the eNB 110. In addition, the number of UEs may be two or more. However, in the following embodiment, uplink signal transmission will be described under assumption that the number of UEs is two including eNB 110 and RRH 112.

Referring again to FIG. 2 and FIG. 3, the first UE 120 and the second UE 122 may transmit, respectively to the first T/R point 110 and second T/R point 112, a scheduling request (SR), HARQ (Hybrid ARQ)-ACK with respect to a received downlink data channel transmission block, a report of a UE in association with a downlink channel state, through an uplink control channel (for example, PUCCH (Physical Uplink Control CHannel)). The first UE 120 and the second UE 122 may transmit uplink data through an uplink data channel (for example, PUSCH (Physical Uplink Shared CHannel)). In addition, the first UE 120 and the second UE 122 may transmit a reference signal (for example, DM-RS (DeModulation Reference Signal)) to be used for demodulating an uplink channel, respectively to the first T/R point 110 and the second T/R point 112.

Hereinafter, in the present specification, the UE 120 will represent not only the first UE 120 but also the second UE 122 w, and the T/R point 110 will represent not only first T/R point 110 but also the second T/R point 112.

In this instance, various PUCCH formats as shown in the following Table 1 may be supported.

TABLE 1

| PUCCH format | Modulation scheme | Number of bits per subframe, $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

PUCCH format 1/1a/1b is used for transmission of a scheduling request (SR) and a HARQ-ACK. PUCCH format 2/2a/2b is used for transmission of a Channel Quality Indicator (CQI)/Precoding Matrix Indicator (PMI)/Rank Indication (RI). PUCCH format 3 is used for transmission of a plurality of HARQ-ACKs/NACKs.

All PUCCH formats use a cell-specific cyclic shift (cs) $n_{cs}^{cell}(n_s,l)$. $n_{cs}^{cell}(n_s,l)$ may be defined as shown in the following Equation 1, based on a symbol number (l) and a slot number $n_s$.

$$n_{cs}^{cell}(n_s,l)=\Sigma_{i=0}^{7}c(8N_{symb}^{UL} \cdot n_s+8l+i) \cdot 2^i \quad \text{[Equation 1]}$$

In Equation 1, $N_{symb}^{UL}$ corresponds to the total number of Single Carrier Frequency Division Multiple Access (SC-FDMA) symbols used in a single slot in an uplink. c(i) is a pseudo-random sequence and an initial value $c_{init}$ is a cell ID $N_{ID}^{cell}$. Therefore, a cyclic shift of a PUCCH may be determined based on a cell ID.

Figure 4:
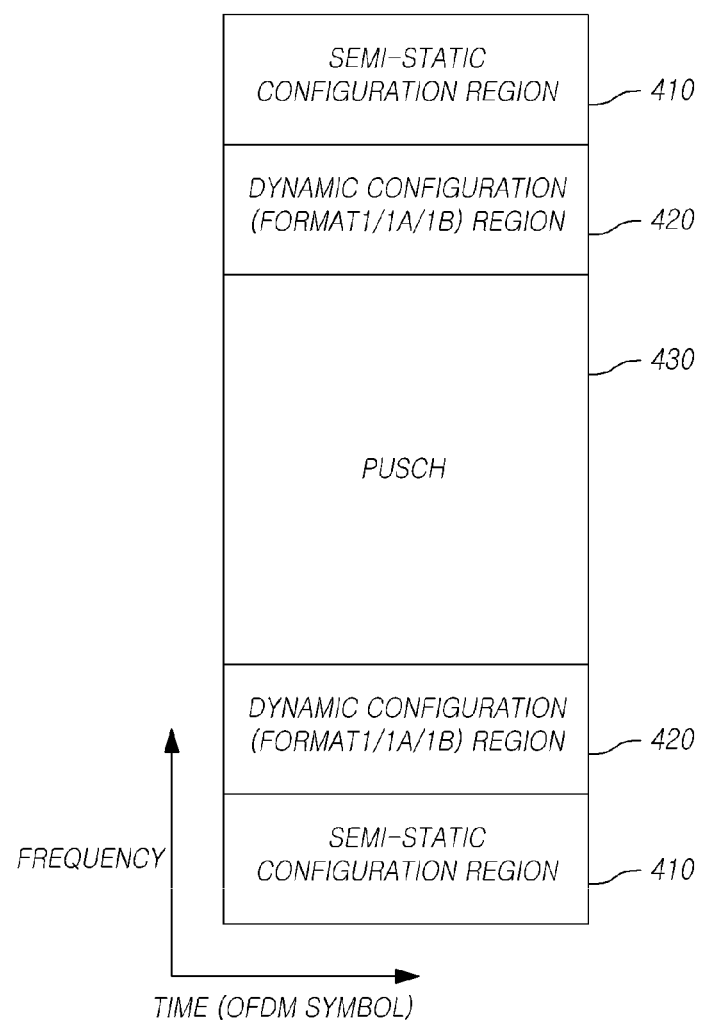
FIG. 4 illustrates mapping control information in a Resource Block (RB) for each PUCCH format.

FIG. 4 is a diagram for describing a scheme of mapping control information in a Resource Block (RB) for each PUCCH format.

In a slot $n_s$, a physical resource block used for transmission of a PUCCH, as illustrated in FIG. 4, may be defined by Equation 2.

$$n_{PRB} = \begin{cases} \lfloor \frac{m}{2} \rfloor & \text{if } (m+n_s \text{mod}2)\text{mod}2 = 0 \\ N_{RB}^{UL} - 1 - \lfloor \frac{m}{2} \rfloor & \text{if } (m+n_s \text{mod}2)\text{mod}2 = 1 \end{cases} \quad \text{[Equation 2]}$$

In Equation 2, a variable m is dependent upon a PUCCH format.

For formats 1, 1a and 1b, m is $$m = \begin{cases} N_{RB}^{(2)} & \text{if } n_{PUCCH}^{(1,\tilde{p})} < c \cdot N_{cs}^{(1)}/\Delta_{shift}^{PUCCH} \\ \left\lfloor \dfrac{n_{PUCCH}^{(1,\tilde{p})} - c \cdot N_{cs}^{(1)}/\Delta_{shift}^{PUCCH}}{c \cdot N_{sc}^{RB}/\Delta_{shift}^{PUCCH}} \right\rfloor + & \text{otherwise} \\ N_{RB}^{(2)} + \left\lceil \dfrac{N_{cs}^{(1)}}{8} \right\rceil \end{cases}$$

$$c = \begin{cases} 3 & \text{normal cyclic prefix} \\ 2 & \text{extended cyclic prefix} \end{cases}$$

and,

For formats 2, 2a, and 2b, m is $m = \lfloor n_{PUCCH}^{(2,\tilde{p})}/N_{sc}^{RB} \rfloor$.
For format 3, m is $m = \lfloor n_{PUCCH}^{(3,\tilde{p})}/N_{SF,0}^{PUCCH} \rfloor$.

In Equation 2, $n_{PRB}$ is a physical resource block number, $N_{RB}^{UL}$ is the number of uplink resource blocks, and $N_{sc}^{RB}$ is the number of subcarriers in a single resource block. $N_{sc}^{(2)}$ is a value transferred through higher layer signaling, and $N_{RB}^{(2)} \geq 0$ indicates a resource block available for transmission of PUCCH format 2/2a/22b in each slot. $N_{cs}^{(1)}$ is the number of cyclic shifts used for PUCCH format 1/1a/1b in a resource block where PUCCH format 1/1a/1b and PUCCH format 2/2a/2b are used together, and is an integer multiple of $\Delta_{shift}^{PUCCH}$, and $\Delta_{shift}^{PUCCH}$ is transferred through higher layer signaling. Orthogonal resources used for transmission of PUCCH format 1/1a/1b, 2/2a/2b, and 3 are expressed by $$n_{PUCCH}^{(1,\tilde{p})}, n_{PUCCH}^{(2,\tilde{p})} < N_{RB}^{(2)} N_{sc}^{RB} + \left\lceil \dfrac{N_{cs}^{(1)}}{8} \right\rceil \cdot (N_{sc}^{RB} - N_{cs}^{(1)} - 2),$$

and $n_{PUCCH}^{(3,\tilde{p})}$, respectively.

Referring to Equation 2, resource blocks corresponding to $N_{RB}^{(2)}$ on an outermost edge of an uplink bandwidth are used for PUCCH format 2/2a/2b transmission, and information $N_{RB}^{(2)}$ thereof may be transferred through uplink signaling. In at most one inside resource block out of resource blocks for PUCCH format 2/2a/2b transmission, PUCCH format 1/1a/1b and PUCCH format 2/2a/2b are used together, and a parameter indicating the number of orthogonal resources used for PUCCH format 1/1a/1b in the resource block is $N_{cs}^{(1)}$. Subsequent resource blocks are used for PUCCH format 1/1a/1b transmission.

In Equation 2, an index of a resource block only for PUCCH format 1/1a/1b is increased by one for each $n_{PUCCH}^{(1,\tilde{p})}$ for $c \cdot N_{SC}^{RB}/\Delta_{shift}^{PUCCH}$ times with respect to $n_{PUCCH}^{(1,\tilde{p})} \geq c \cdot N_{cs}^{(1)}/\Delta_{shift}^{PUCCH}$, for each two slots in a single subframe. That is, with respect to each predetermined subframe to which a PUCCH is mapped, the total number of resource indices $n_{\tilde{p}}'(n_s)$ in two resource blocks of a single subframe formed of two slots is $c \cdot N_{SC}^{RB}/\Delta_{shift}^{PUCCH}$, which indicates the total number of resources having orthogonality in the resource blocks.

That is, $n_{PUCCH}^{(1,\tilde{p})}$ is a parameter indicating an index of an orthogonal resource with respect to all the orthogonal resources used for PUCCH format 1/1a/1b with respect to an antenna index $\tilde{p}$, and $n_{\tilde{p}}'(n_s)$ is a parameter indicating an index of an orthogonal resource with respect to all the orthogonal resources used in a single resource block.

An antenna port-based PUCCH resource mapping for HARQ ACK/NACK feedback with respect to PDSCH reception of a UE for which PDSCH allocation information is transmitted through reception of downlink scheduling information through the typical legacy PDCCH allocated to a control region of a resource block, may be determined based on a higher layer parameter (for example, RRC parameter) and an index of a Control Channel Element (CCE) through which the corresponding downlink scheduling information is transmitted, as shown in the following Equations 3 and 4.

$$n_{PUCCH}^{(1,\tilde{p}0)} = n_{CCE} + N_{PUCCH}^{(1)} \qquad \text{[Equation 3]}$$

$$n_{PUCCH}^{(1,\tilde{p}1)} = n_{CCE} + 1 + N_{PUCCH}^{(1)} \qquad \text{[Equation 4]}$$

Equations 3 and 4 indicate a PUCCH resource $n_{PUCCH}^{(1,\tilde{p}0)}$ for HARQ ACK/NACK feedback for each of antenna port 0 and antenna port 1, in a UE supporting two antenna port transmission. $n_{CCE}$ indicates the lowest CCE index value of a CCE through which the corresponding downlink scheduling information is transmitted. $n_{CCE}$ may be defined dynamically.

$N_{PUCCH}^{(1)}$ is a UE-specific parameter that is set by higher layer signaling (for example, RRC signaling). $N_{PUCCH}^{(1)}$ may be applied as an offset for PUCCH format 1/1a/1b resource allocation and may determine a point where a dynamically allocated PUCCH area begins.

As described above, resource blocks in an area for PUCCH format 2/2a/2b and an area where PUCCH format 2/2a/2b and 1/1a/1b are used together. The resource blocks may be semi-statically determined through higher layer signaling. Resource blocks in the area for PUCCH format 1/1a/1b may be dynamically determined. Therefore, uplink transmission resources may be classified into a semi-static configuration area 410, a dynamic configuration area 420 where PUCCH format 1/1a/1b are configured, and a PUSCH area 430, as shown in FIG. 4.

In this instance, the above described PUCCH resource mapping method based on Equations 3 and 4 is a PUCCH resource mapping method for HARQ ACK/NACK transmission through PUCCH format 1a/1b of a UE set with a single serving cell in a frame structure type 1 (FDD) system. Additionally, a PUCCH resource mapping rule with respect to a UE set with one or more serving cells (e.g., a UE employing Carrier Aggregation (CA)) is determined as a function of a higher layer parameter and the lowest CCE index. Or an ACK/NACK Resource Indication (ARI) scheme may be used. The ARI scheme sets a plurality of candidate PUCCH resource values in advance through higher layer signaling and indicates a PUCCH resource to be used among the candidate PUCCH resource values through a 'TPC command for PUCCH' information area of actual downlink scheduling information.

Figure 5:
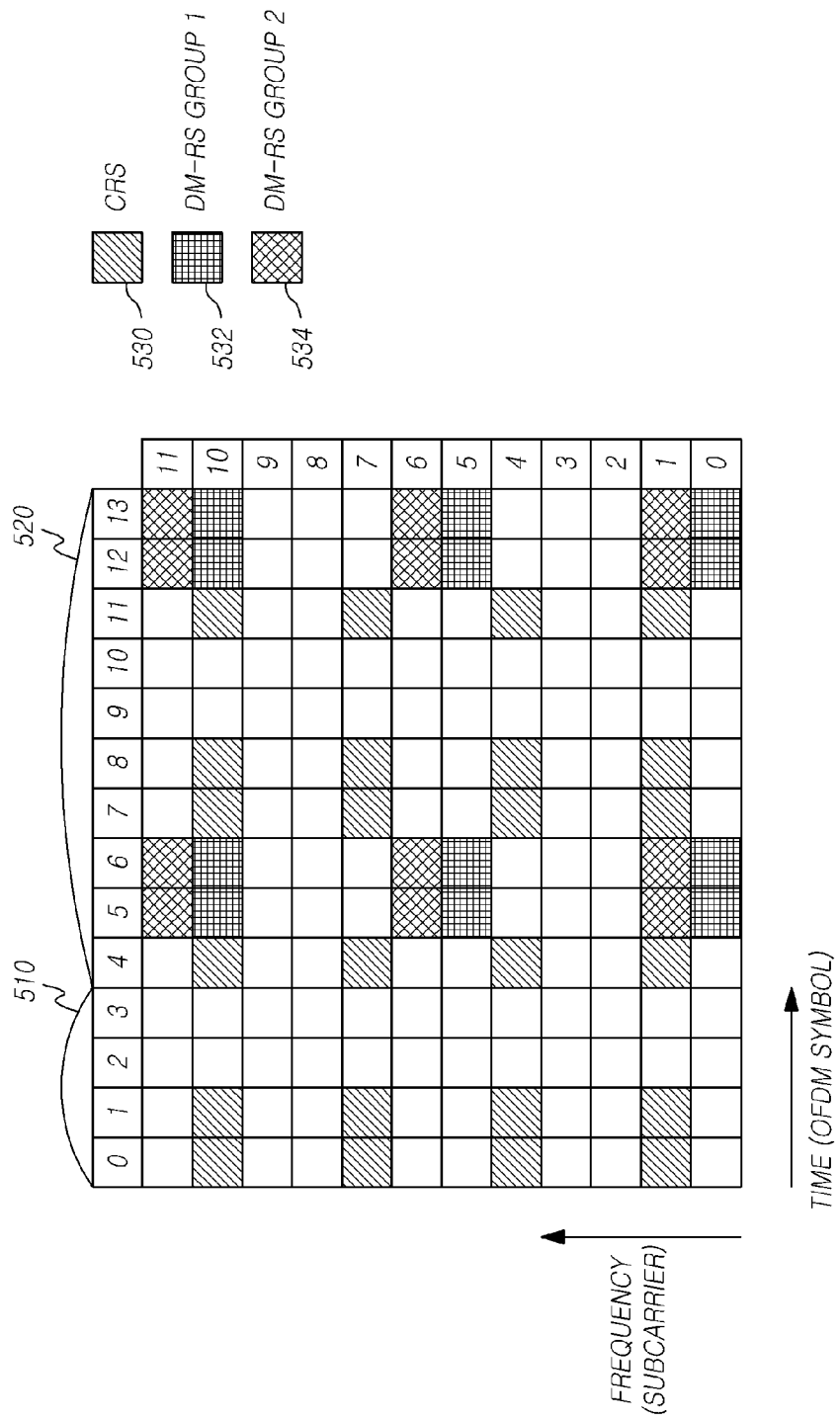
FIG. 5 illustrates a single resource block pair of a downlink subframe in cases with a normal cyclic prefix (CP) in Long Term Evolution (LTE) or LTE-Advanced (LTE-A)

FIG. 5 illustrates a single resource block pair of a downlink subframe for a normal cyclic prefix (CP) in Long Term Evolution (LTE) or LTE-Advanced (LTE-A).

Referring to FIG. 5, in the case of normal Cyclic Prefix (CP), a single resource block pair of a downlink subframe may include 14×12 resource elements (for extended CP, 12×12 resource elements). A Resource Element (RE) may be formed of a single OFDM symbol in a time axis, and a single subcarrier in a frequency axis.

Front four OFDM symbols (l=0~3) of 14 OFDM symbols that belongs to a single resource block pair may be a control region 510 that is allocated for a control channel such as Physical Control Format Information Channel (PCFICH), Physical Hybrid ARQ Indicator Channel (PHICH), Physical Downlink Control Channel (PDCCH), and the like. The remaining OFDM symbols (l=4~13) may be a data region

520 that is allocated for a data channel such as a Physical Downlink Shared Channel (PDSCH). Although FIG. 5 illustrates that 4 OFDM symbols are allocated for the control region 510, it is possible that 1 to 4 OFDM symbols may be allocated for the control region 510. Size information of an OFDM symbol of the control region 510 may be transferred through a PCFICH.

A reference signal may be mapped to a predetermined resource element of a downlink. That is, in the downlink, a common Reference Signal or a Cell-specific Reference Signal (CRS) 530, a DeModulation Reference Signal (DM-RS) or a UE-specific Reference Signal 532 and 534, a Channel Status Information Reference Signal (CSI-RS), and the like may be transmitted. For the ease of description, FIG. 5 illustrates only the CRS 530 and the DM-RS 532 and 534.

The CRS 530 located in the control region 510 may be used for channel estimation for decoding a PDCCH, and the CRS 530 located in the data region 520 may be used for downlink channel estimation. The channel estimation for data decoding in the data region 520 may be executed using the DM-RS 532 and 534.

A resource of the control region 510 may be an overhead of a system and may reduce a resource of the data region 520 used for data transmission. In an LTE-A system that enables data transmission to a large number of users, a limited amount of resources in the control region 510 limits an increase in system capacity. Therefore, increase in resources of a control channel is needed. Thus, a control channel transceiving method for multiple users using a space division multiplexing scheme in the data region 520 may be considered. This method is to transmit and receive a control channel in the data region 520. For example, a control channel transmitted in the data region 520 may be referred to as an Extended PDCCH or Enhanced PDCCH (EPDCCH), but the control channel may not be limited thereto.

In the data region 520, a control channel resource may be allocated based on a resource block (or a resource block pair) unit, for compatibility with a data channel resource (for example, a PDSCH). A DM-RS may be used for transmitting a control channel in the data region 520. Thus, the control channel may be transmitted using beamforming technology.

In the present specification, the allocation of control information has the same meaning as the allocation of a control channel. In other words, the allocation of a control channel indicates the allocation of control information to resource elements.

An EPDCCH may be transmitted through a few PRBs of a plurality of EPDCCH set formed of a group of X Physical Resource Blocks (PRBs) where X is a natural number greater than or equal to 1 and less than or equal to the number of PRBs in the entire band.

The EPDCCH set may be a localized type or a distributed type, based on an EPDCCH transmission type. X may be 1 or $2^n$ (n=1, 2, 3, 4, 5) in the case of the localized type, but the present embodiment is not limited thereto. In the case of the distributed type, X may be 2, 4, 8, and 16, but the present embodiment is not limited thereto.

K EPDCCH sets (K=1) may be configured to be UE-specific. In this instance, the highest value of K may be one of 2, 3, 4, and 6, but the present embodiment is not limited thereto. K EPDCH sets may not have X PRB pairs, equally.

Each EPDCCH set may be configured to be one of a localized-type EPDCCH and a distributed-type EPDCCH. That is, each EPDCCH set may not be configured as a combination of a localized-type EPDCCH or a distributed-type EPDCCH. For example, K EPDCCH sets may be configured to include KL sets (KL=0) as the localized-type EPDCCH and KD sets (KD=0) as the distributed-type EPDCCH. In this instance, KL and KD may be 0.

K EPDCCH sets may be allocated for a single UE, and each EPDCCH set is a distributed-type or a localized-type. Thus, KL localized type-EPDCCHs and KD distributed-type EPDCCHs may be allocated for a single UE. That is, KL+KD=K.

In K EPDCCH sets (K=1), K may be a maximum of 2. In this instance, the combination of KL and KD may be {KL=1, KD=0}, {KL=0, KD=1}, {KL=1, KD=1}, {KL=0, KD=2}, and {KL=2, KD=0}.

A PDCCH is formed of 9 to 72 REGs based on a Downlink Control Information (DCI) format which is reception control information of a UE and an aggregation level used for increasing reliability of a PDCCH. The reason that at least 9 REGs are required is that at least 70-bit information needs to be transmitted through a DCI format. A single RE is modulated by QPSK and 35 REs are required for 2-bit transmission. Thus, 36 REs=9 REGs is used as the minimum unit. A PDCCH uses a control channel element (CCE) formed of 9 REGs, as a basic unit.

To allocate control information in a data region, resource element grouping may be executed in a similar manner. In other words, an EREG may be formed by grouping a plurality of REs in a data region, and an ECCE may be formed to include the plurality of EREGs. Although an EREG is used to distinguish the term in the present descriptions from an REG which is a group of a plurality of REs and used in a legacy PDCCH, the present embodiment is not limited thereto.

The control information allocated to the data region may be allocated using the ECCE as a basic unit. In other words, an EPDCCH may be allocated using an ECCE as a basic unit.

An EREG may be grouped based on a property of an index assigned to each RE of a PRB.

Figure 6:
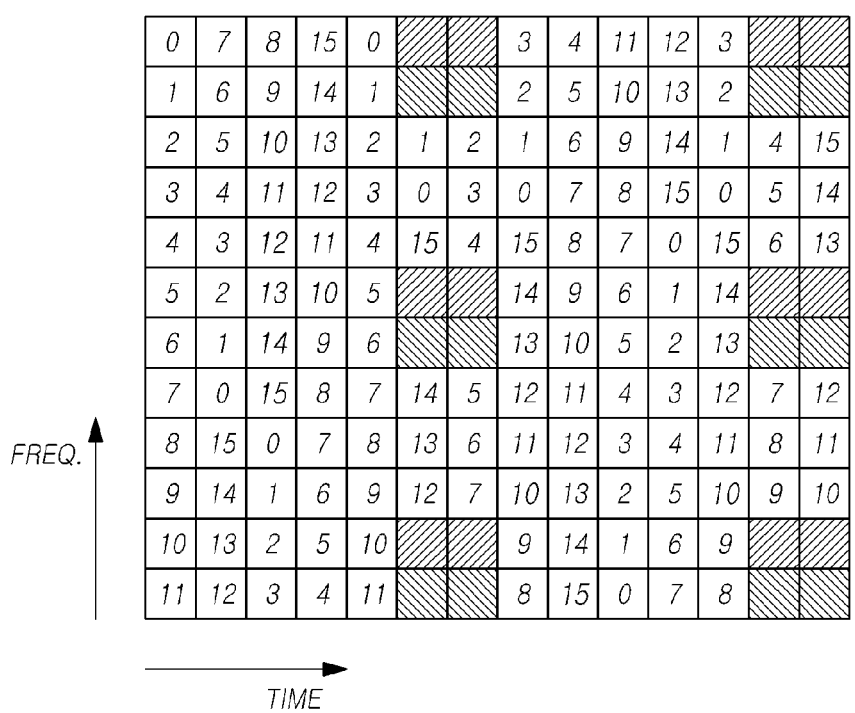
FIG. 6 illustrates assigning an index to a resource element in a resource block pair (PRB pair)

FIG. 6 illustrates assigning an index to a resource element in a resource block pair (PRB pair).

Referring to FIG. 6, 16 numbers are repeatedly assigned as indices in a resource block pair based on a frequency. In an identical symbol area, a number sequentially from 0 is assigned as an index to each resource element based on a frequency. When assignment of an index in one symbol is completed, an index may be continuously assigned to a resource element of a symbol that is adjacent or closest to a resource element to which the last index is assigned. Thus, indices may be assigned to the entire resource elements. Here, indices from 0 to 15 may be assigned to resource elements. After a $15^{th}$ resource element, indices from 0 may be sequentially assigned again.

Resource elements having an identical index among resource elements may be grouped into a single EREG. When an EREG is formed of resource elements having an identical index, a total of 16 EREGs may exist in a single resource block pair.

A single ECCE may be formed by grouping 4 or 8 EREGs as described above.

ECCEs to which an EPDCCH is allocated in a localized EPDCCH transmission exist in a single resource block pair, and ECCEs to which an EPDCCH is allocated in a distributed EPDCCH transmission may exist in two or more resource block pairs.

Figure 7:
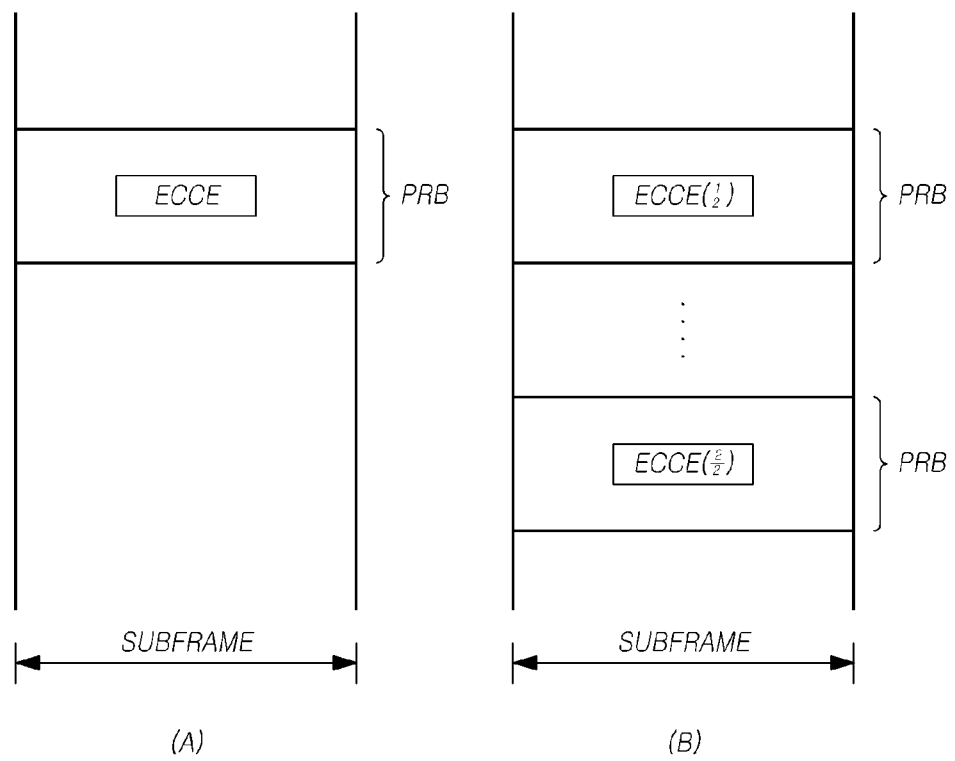
FIG. 7 illustrates two types of EPDCCH transmissions, a localized-EPDCCH transmission and a distributed EPDCCH transmission.

FIG. 7 illustrates two types of EPDCCH transmissions, a localized EPDCCH transmission and a distributed EPDCCH transmission.

The number of downlink Physical Resource Blocks (PRBs) forming a system bandwidth supported by a cell formed by a communication common carrier is referred to as $N_{PRB}$. In this instance, an EPDCCH transmitted through a corresponding PDSCH area may be roughly classified into a localized EPDCCH transmission and a distributed EPDCCH transmission, as shown in (a) and (b) of FIG. 7. Accordingly, an ECCE structure and the number of REs forming a single ECCE may be changed based on an EPDCCH transmission type, or may be identical irrespective of an EPDCCH transmission type.

The localized EPDCCH transmission of (a) of FIG. 7 indicates that a single ECCE is located in a single resource block pair and is transmitted. The distributed EPDCCH transmission of (b) of FIG. 7 indicates that a single ECCE is distributed in at least two resource block pairs and is transmitted.

An ECCE corresponds to a predetermined number of resource element groups (enhanced Resource Element Groups (EREGs). Each EREG indicates a predetermined number of available REs. In conclusion, an ECCE indicates a set of REs available for EPDCCH transmission. The number of ECCEs required for a predetermined EPDCCH may be changed based on a size of control information (DCI payload) and a channel code rate. In this instance, the number of ECCEs required for a predetermined EPDCCH is referred to as an Aggregation Level (AL).

In the present specification, the number of REs forming an ECCE for the localized EPDCCH transmission is $N_{ECCE,L}$, and the number of REs forming an ECCE for the distributed EPDCCH transmission is $N_{ECCE,D}$. In this instance, when a maximum number of REs available for EPDCCH transmission in a single PRB or VRB (Virtual Resource Block) is $N_{RB,RE}$, the number of ECCEs that may be transmitted through the corresponding PRB (or VRB) may be $[N_{RB,RE}/N_{ECCE,L}]$ for the localized EPDCCH transmission and may be $[N_{RB,RE}/N_{ECCE,D}]$ for the distributed EPDCCH transmission. That is, when the minimum number of REs is used for another downlink physical signal and physical channel in the corresponding PRB (or VRB), a maximum number of ECCEs that may be transmitted through the corresponding PRB is $[N_{RB,RE}/N_{ECCE,L}]$ or $[N_{RB,RE}/N_{ECCE,D}]$ depending on the described EPDCCH transmission type.

The recent LTE-A system needs to define a PUCCH resource mapping method for uplink HARQ ACK/NACK feedback of a UE that receives downlink scheduling information through an EPDCCH that is newly introduced into a data region (PDSCH area) for improving capacity of a downlink control channel and overall capacity in the LTE-A system.

The present disclosure provides a PUCCH resource mapping method for uplink HARQ ACK/NACK feedback of a UE that receives downlink scheduling information through a newly introduced EPDCCH. In particular, the present disclosure provides a method of defining an implicitly determined part and an explicitly determined part, for determining PUCCH resource mapping for a UE that receives Downlink Control Information (DCI) through an EPDCCH, and when an ECCE index of an EPDCCH, which is a similar concept to a CCE index of an existing legacy PDCCH, is used as the implicitly determined part, the present disclosure provides an ECCE indexing method for the corresponding EPDCCH.

In particular, an antenna port-based PUCCH resource mapping may be provided for HARQ ACK/NACK feedback of PDSCH reception of a UE that transmits PDSCH allocation information through reception of downlink scheduling information through an EPDCCH allocated to the data region 520 of a resource block. The antenna port-based PUCCH resource mapping may include an implicitly determined parameter implicit $n_{implicit}$ (corresponding to $n_{CCE}$ of Equations 3 and 4), determined by an ECCE, an explicitly determined parameter $n_{explicit}^{(k)}$ ($N_{PUCCH}^{(1)}$ of Equations 3 and 4), and an implicitly determined offset $offset_i$, as components for PUCCH resource determination.

Such an antenna port-based PUCCH resource mapping may be determined by Equation 5 and Equation 6.

$$n_{PUCCH}^{(1,\tilde{p}0)} = n_{implicit} + N_{explicit}^{(k)} + offset_i \qquad \text{[Equation 5]}$$

$$n_{PUCCH}^{(1,\tilde{p}1)} = n_{implicit} + 1 + N_{explicit}^{(k)} + offset_i \qquad \text{[Equation 6]}$$

The explicitly determined parameter $N_{explicit}^{(k)}$ is one of the components for a PUCCH resource determination. Such an explicitly determined parameter explicit $N_{explicit}^{(k)}$ will be described in detail.

As an example of determining the explicitly determined parameter, for a UE receiving downlink scheduling information associated with a PDSCH transmission through a legacy PDCCH allocated to a control region, an RRC parameter $N_{PUCCH}^{(1)}$ transmitted through UE-specific higher layer signaling from a T/R point (base station or an eNB) for the uplink HARQ ACK/NACK resource mapping may be applied to all UEs in a corresponding cell.

The present disclosure is related to uplink HARQ ACK/NACK resource mapping for a UE configured to receive downlink scheduling information associated with a PDSCH transmission through an EPDCCH, and the UE-specific RRC parameter $N_{PUCCH}^{(1)}$ may be reused for the legacy PDCCH UE, as a first method of determining a value corresponding to $N_{explicit}^{(k)}$ explicit of Equations 5 and 6.

In this instance, the UE configured to receive a DCI through an EPDCCH may use $N_{PUCCH}^{(1)}$ included in system information received from a base station as $N_{explicit}^{(k)}$ of Equations 5 and 6 when performing PUCCH resource mapping for uplink HARQ ACK/NACK transmission, in the same manner as the UE that receives a DCI through an existing legacy PDCCH.

Another embodiment of determining an explicitly determined parameter, for a UE configured to receive a DCI through an EPDCCH, an explicitly determined parameter $N_{explicit}^{(k)}$ may be set independently for each UE through UE-specific higher layer signaling.

That is, when a UE is configured to receive a DCI through an EPDCCH, a corresponding T/R point transmits an explicitly determined parameter $N_{explicit}^{(k)}$ for the corresponding UE, and the UE applies PUCCH resource mapping based on Equations 5 and 6, using the same.

As another embodiment of determining an explicitly determined parameter, n explicitly determined parameters $N_{explicit}^{(k)}$ (k=0 to n−1), $N_{explicit}^{(0)}$, $N_{explicit}^{(1)}$, ..., and $N_{explicit}^{(n-1)}$, are set through UE-specific higher layer signaling for a UE configured to receive a DCI through an EPDCCH. Then, a parameter may be indicated from among the n parameters to be applied for HARQ ACK/NACK feedback PUCCH resource mapping when downlink scheduling information for the corresponding UE is transmitted.

To this end, a new M-bit (M=log n) information field (n≤$2^M$) for ACK/NACK resource indication is newly defined in the downlink scheduling information for the corresponding UE. Alternatively, an existing information area (information field) of the downlink scheduling information of the corresponding UE may be utilized for the purpose of a corresponding ACK/NACK resource indication. For example, an existing 'TPC command for PUCCH' information area is utilized for the purpose of ACK/NACK resource indication. For example, when $N_{explicit}^{(k)}$ (k=0 to n-1) and n=4, an explicitly determined parameter $N_{explicit}^{(k)}$ may be determined as shown in the following Table 2.

TABLE 2

| Value of 'TPC command for PUCCH' | $N_{explicit}^{(k)}$ |
|---|---|
| '00' | The 1$^{st}$ PUCCH resource value configured by the higher layers, $N_{explicit}^{(0)}$ |
| '01' | The 2$^{nd}$ PUCCH resource value configured by the higher layers, $N_{explicit}^{(1)}$ |
| '10' | The 3$^{rd}$ PUCCH resource value configured by the higher layers, $N_{explicit}^{(2)}$ |
| '11' | The 4$^{th}$ PUCCH resource value configured by the higher layers, $N_{explicit}^{(3)}$ |

For example, when n=4, the 'TPC command for PUCCH' information area has 2 bits. When a value thereof is '10', $N_{explicit}^{(2)}$ may be applied as $N_{explicit}^{(k)}$ of Equations 5 and 6.

However, ACK/NACK resource indication with respect to candidate parameters $N_{explicit}^{(k)}$ allocated through UE-specific higher layer signaling may be executed by utilizing another information area of the downlink scheduling information for a corresponding UE, in addition to a 'TPC command for PUCCH'.

The implicitly determined parameter $n_{implicit}$ is one of the components for a PUCCH resource determination. Hereinafter, such an implicitly determined parameter $n_{implicit}$ will be described in detail.

As an example of determining the implicitly determined parameter, FIG. 6 illustrates two types of EPDCCH transmissions, a localized EPDCCH transmission and a distributed EPDCCH transmission.

$N_{PRB}$ denotes the number of downlink Physical Resource Blocks (PRBs) forming a system band supported by a cell formed by a communication common carrier. In this instance, an EPDCCH transmitted through a corresponding PDSCH area may be roughly classified into a localized EPDCCH transmission and a distributed EPDCCH transmission, as shown in (a) and (b) of FIG. 6. Accordingly, an ECCE structure and the number of REs forming a single ECCE may be changed based on an EPDCCH transmission type, or may be identical irrespective of an EPDCCH transmission type.

The localized EPDCCH transmission of (a) of FIG. 6 indicates that a single ECCE is located in a single resource block pair and is transmitted. The distributed EPDCCH transmission of (b) of FIG. 6 indicates that a single ECCE is distributed in at least two resource block pairs and is transmitted.

A UE may use an index of the lowest PRB (or VRB) among PRBs (or VRBs) used for EPDCCH transmission for the corresponding UE in a localized or distributed EPDCCH set, configured for the corresponding UE, as $n_{implicit}$ of a PUCCH resource mapping equation for HARQ ACK/NACK feedback. That is, PRBs of the localized or distributed EPDCCH set formed of X resource block pairs of a subframe allocated for a UE are indexed with 0 to X-1, sequentially from the lowest PRB, where X is a natural number greater than or equal to 1 and less than or equal to the number of RBs of the entire band. When an index of the lowest PRB among the PRBs used for EPDCCH transmission for the corresponding UE is $n_{PRB}$(that is, a natural number that satisfies $0 \leq n_{PRB} \leq x-1$), $n_{PRB}$ may be used for PUCCH resource mapping for PUCCH ACK/NACK feedback. As an example, as $n_{implicit}$ of Equations 5 and 6 for PUCCH resource mapping for uplink HARQ ACK/NACK feedback of the corresponding UE, $n_{PRB}*[N_{RB,EREG}/N_{REG,L}]=n_{PRB}*N_{ECCE,L}$ may be used when a corresponding EPDCCH corresponds to a localized EPDCCH transmission. $n_{PRB}*[N_{RB}, E_{REG}/N_{REG,D}] n_{PRE}*N_{ECCE,D}$ may be used when the corresponding EPDCCH corresponds to a distributed EPDCCH transmission. That is, when the number $N_{ECCE,L}$ of ECCEs set through a single PRB of a localized EPDCCH set and the number $N_{ECCE,D}$ of ECCEs set through a single PRB of a distributed EPDCCH set are applied, $n_{PRB}*N_{ECCE,L}$ may be used as $n_{implicit}$ Equations 5 and 6 for PUCCH resource mapping for uplink HARQ ACK/NACK feedback of the corresponding UE when the corresponding EPDCCH corresponds to a localized EPDCCH transmission. $n_{PRB}*N_{ECCE,D}$ may be used when the corresponding EPDCCH corresponds to a distributed EPDCCH transmission.

To summarize, the lowest index of a PRB that transmits control information of X PRBs (VRBs) forming an EPDCCH may be used as a resource determination component when PUCCH resource mapping is performed for ACK/NACK with respect to a PDSCH allocated based on downlink scheduling information. In particular, a product of the lowest index of the PRB and the number of ECCEs set through each PRB may be used as a resource determination component when PUCCH resource mapping is performed for ACK/NACK with respect to a PDSCH allocated based on downlink scheduling information. In this instance, EPDCCH set may be a localized EPDCCH set or a distributed EPDCCH set.

As another example of determining an implicitly determined parameter, when a UE receives downlink scheduling information through an EPDCCH allocated to the data region 520 of a resource block, the UE may determine $n_{implicit}$ of Equations 5 and 6 for PUCCH resource mapping for uplink HARQ ACK/NACK feedback of the corresponding UE, based on a function of the number of blind decoding operations attempted until the corresponding downlink scheduling information is received. For example, when the corresponding downlink scheduling information is received through an N$^{th}$ blind decoding of the UE, N may be applied as $n_{implicit}$.

To this end, a blind decoding procedure of a UE configured to receive a DCI through an EPDCCH needs to be defined. As an EPDCCH blind decoding procedure of a corresponding UE, an EPDCCH transmission type dependent blind decoding method may be defined.

When both of a distributed EPDCCH search space and a localized EPDCCH search space are set for a UE for which an EPDCCH is configured, blind decoding with respect to the distributed EPDCCH search space is performed first. Then blind decoding with respect to the localized EPDCCH search space is performed. In this instance, the UE performs blind decoding with respect to the distributed EPDCCH search space, in order of ECCE aggregation level 1, 2, 4, 8, and the like. The UE moves to the localized EPDCCH search space and executes blind decoding in order of ECCE aggregation level 1, 2, 4, 8 and the like. Conversely, the method may be defined to perform blind decoding with respect to the localized EPDCCH search space first.

As another method, an aggregation level dependent blind decoding method may be defined. In this instance, blind decoding may be performed in order of ECCE aggregation level 1, 2, 4, 8, and the like. That is, when both of a distributed EPDCCH search space and a localized EPDCCH search space are set for a UE, the method may be defined to perform blind decoding with respect to aggregation level 1 of the distributed EPDCCH search space and to perform blind decoding with respect to aggregation level 1 of the localized EPDCCH transmission type, and then to perform blind decoding with respect to aggregation level 2, 4, 8, and the like, based on a distributed EPDCCH search space first scheme, in order from a low aggregation level to a high aggregation level. Conversely, the method may be defined to perform blind decoding based on a high aggregation level first scheme.

In this instance, the order of a corresponding blind decoding is applied only to downlink scheduling information, the order is assigned with respect to DCI format 1A, which is fallback downlink scheduling information of the downlink scheduling information, based on the above described rule. Subsequently, the order is assigned with respect to a PDSCH transmission mode dependent DCI format.

As another example of determining an implicitly determined parameter, when a UE configured to receive a DCI through an EPDCCH, ECCE indexing is performed for each UE in a search space set to be UE-specific, and the lowest ECCE index of an ECCE through which the downlink scheduling information is transmitted, is applied as $n_{implicit}$.

ECCE indexing may define an index for each EPDCCH transmission type based-search space, in the similar manner to the above described embodiment that determines $n_{implicit}$ based on a function of the number of blind decodings. That is, as an EPDCCH search space for a UE, when M PRB(s) are allocated as a distributed EPDCCH search space and L PRB(s) are set as a localized EPDCCH search space, the number $n_{ECCE,D}$ of ECCEs generated in the distributed EPDCCH search space is determined based on M, and $n_{ECCE,L}$ of the localized EPDCCH search space is determined based on L. Here, M is a natural number greater than or equal to 1 and less than or equal to the number of PRBs in the entire band. L is a natural number greater than or equal to 1 and less than or equal to the number of PRBs in the entire band. Accordingly, as the ECCE indexing method of the corresponding UE, the ECCE indexing method may be defined to index ECCEs of the distributed EPDCCH search space with 0 to ($n_{ECCE,D}-1$), and to index ECCEs of the localized EPDCCH search space with $n_{ECCE,D}$ to ($n_{ECCE,D}+n_{ECCE,L}-1$).

As another example, ECCE indexing with respect to a distributed EPDCCH search space and a localized EPDCCH search space may be executed separately. In this instance, ECCE indices from 0 to ($n_{ECCE,D}-1$) may be defined for the ECCEs of the distributed EPDCCH search space, and separately, ECCE indices from 0 to ($n_{ECCE,L}-1$) may be defined with respect to the ECCEs of the localized EPDCCH search space.

In addition, when a plurality of EPDCCH sets formed of a group of X PRBs is allocated for each EPDCCH transmission type or for a predetermined EPDCCH transmission type, EPDCCH or ECCE indexing may be executed for each EPDCCH set, separately. Here, X is a natural number greater than or equal to 1 and less than or equal to the number of PRBs in the entire band. In this instance, the number of PRBs forming a single EPDCCH set may be X=(1), 2, 4, 8 for a localized type and 2, 4, 8, (16) for a distributed type.

For example, $K_L$ EPDCCH sets from EPDCCH set #1~EPDCCH set #$K_L$, which form a localized EPDCCH search space for a UE (for example, a first UE (UE1)) configured to receive a DCI through an EPDCCH may be assigned. $K_D$ EPDCCH sets from EPDCCH set #1~EPDCCH set #$K_D$, which form a distributed EPDCCH search space, may be assigned. In this instance, ECCEs forming EPDCCH set #n of the localized type are indexed with 0 to ($X_{Ln}*N-1$) with respect to n=1, . . . , $K_L$, and ECCEs forming the distributed EPDCCH set #m are indexed with 0 to ($X_{Dm}*N-1$) with respect to m=1, . . . , $K_D$. Here, with respect to the localized EPDCCH set n=1, . . . , and $K_L$ and the distributed EPDCCH set n=1, . . . , $K_D$, $X_{Ln}$ denotes the number X of PRBs forming the corresponding localized EPDCCH set #n and $X_{Dm}$ denotes the number X of PRBs forming the corresponding distributed EPDCCH set #m.

In addition, N is the number of ECCEs forming a single PRB in a corresponding subframe. N is equal to 2 when 8 EREGs form a single ECCE or N is equal to 4 when 4 EREGs form a single ECCE, based on the number of EREGs forming a single ECCE in the corresponding subframe.

FIG. 7 illustrates a single localized type EPDCCH set having $K_L=1$ and a single distributed type EPDCCH set having $K_D=1$ when X=2 and N=4.

Referring to FIG. 7, X is equal to 2 (X=2) and N is equal to 4 (N=4). A diagram (a) of FIG. 7 is for describing ECCE indexing performed with respect to a single localized EPDCCH set having $K_L=1$, a single distributed EPDCCH set having $K_D=1$, and a single distributed EPDCCH set having $K_D=1$, for each set, separately.

ECCEs forming the single localized EPDCCH set are indexed with ECCE #0 to 7. In this instance, since it is a localized EPDCCH set, a single ECCE is located in a single PRB pair. For example, the entire ECCE #0, for example, all the EREGs forming an ECCE are located in an identical PRB #n.

ECCEs forming the single distributed EPDCCH set are indexed with ECCE #0 to 7. In this instance, since it is a distributed EPDCCH set, a single ECCE is distributed in two PRB pairs. For example, half of ECCE #0 (ECCE(1/2)#0: half of EREGs forming the ECCE) is located in a PRB #m and the other half (ECCE(2/2)#0: the other half of the EREGs forming the ECCE) is located in PRB #m+N.

Here, the order of ECCE indexing in the single localized EPDCCH set may be determined variously. Indexing may be performed sequentially from an ECCE that is located in a lowest frequency position based on a frequency position forming each ECCE. ECCEs may be indexed with 0 to ($X_{Lm}*N-1$), sequentially from an ECCE formed of lowest subcarrier indices of a PRB having the lowest PRB index with respect to a group of X PRBs forming a corresponding EPDCCH set. ECCEs may be indexed with 0 to ($X_{Lm}*N-1$), sequentially from an ECCE of which a lowest EREG index is the smallest in a PRB having a lowest PRB index among a group of X PRBs that forms a corresponding EPDCCH set, or from an ECCE of which a sum of EREG indices forming a corresponding ECCE is the smallest. In this manner, indexing may be performed with respect to the single distributed EPDCCH set according to the order used for the above described localized EPDCCH set.

As another example of determining an implicitly determined parameter, when a UE configured to receive a DCI through an EPDCCH, ECCE indexing is performed for each UE in a search space set to be UE-specific, and the lowest ECCE index of an ECCE through which downlink scheduling information is transmitted, is applied as $n_{implicit}$.

As an ECCE indexing method, for a UE configured to receive a DCI through an EPDCCH, ECCE indexing may be performed based on a resource block(s) allocated for transmission of EPDCCH for the corresponding UE and an EPDCCH transmission type in the corresponding resource block(s).

For example, $L_{max}$ denotes a maximum number of localized ECCEs that may be transmitted through a single PRB. Such $L_{max}$ may be determined to be $L_{max}=[N_{RB,EREG}/N_{ECCE,L}]$ as described in an embodiment that determines an implicitly determined parameter.

On the assumption of the above, when consecutive k PRBs (or VRBs) from PRB(or VRB) #n to PRB(or VRB) #(n+k−1) are allocated for the localized EPDCCH transmission and the number of localized ECCEs defined through the k PRBs (or VRBs) is $K_{eCC,L}(\le k \cdot L_{max})$, localized ECCE indices of the corresponding PRBs (or VRBs) may be indexed with $n \cdot L_{max} \sim (n \cdot L_{max} + K_{eCC,L} - 1)$, sequentially from the lowest ECCE.

Conversely, when m distributed or consecutive PRBs (or VRBs) are allocated for the distributed EPDCCH transmission of the corresponding UE and the number of distributed ECCEs defined through the corresponding PRBs is $K_{eCC,D}$ ($\le m \cdot L_{max}$), distributed ECCE indices of the corresponding PRBs (or VRBs) are indexed with $0 \sim (K_{eCCE,D} - 1)$, sequentially from the lowest ECCE.

In addition, the present disclosure may relate to applying various methods of determining an implicitly determined parameter, based on an EPDCCH set type (localized or distributed type). For example, when an EPDCCH for the corresponding UE is transmitted through a distributed EPDCCH set, the lowest index of a control channel element through which the corresponding EPDCCH is transmitted may be used as the implicitly determined parameter of an equation for PUCCH transmission resource mapping for HARQ ACK/NACK feedback of the corresponding UE. When an EPDCCH for the corresponding UE is transmitted through a localized EPDCCH set, a product of the lowest PRB index and the number of ECCEs set through PRBs may be used as the implicitly determined parameter of the equation for PUCCH transmission resource mapping for HARQ ACK/NACK feedback of the corresponding UE.

An implicitly determined parameter offset $offset_i$ is one of the components for a PUCCH resource determination. Such an implicitly determined parameter offset will be described in detail.

As an example of determining an implicitly determined offset $offset_i$ denoting an implicitly determined offset value may be introduced in a HARQ ACK/NACK PUCCH resource mapping function for a UE configured to receive a DCI through an EPDCCH, in addition to an implicitly determined parameter and an explicitly determined parameter. As described above, when implicitly determined offset $offset_i$ is introduced, the corresponding value may be determined based on a value of a function that uses, as a parameter, a subset of parameters, such as a DM RS antenna port number of a low ECCE through which downlink scheduling information for the corresponding UE is transmitted, an aggregation level, a C-RNTI of the corresponding UE, a system band of a corresponding cell, $N_{pRE}$ and the like.

As an example, a hashing function may be used for determining a UE-specific search space of a UE for each aggregation level of an existing legacy PDCCH located in a control region. In this instance, in the hashing function $L\{(Y_k+m') \bmod \lfloor N_{CCE,k}/L \rfloor\}+i$ or $L\{(Y_k+m') \bmod \lfloor N_{CCE,k}/L \rfloor\}$ that determines a search space of a UE based on an aggregation level (AL), only the total number $N_{CCE,K}$ of CCEs of a PDCCH of a subframe k may be replaced with $N_{PRB}$. In this instance, $Y_k$ is a variable based on an aggregation level of a UE-specific search space or a common search space, m' is determined based on the number of PDCCH candidates and a carrier indicator field value, L indicates an aggregation level (AL), and i is 0, . . . , L−1.

In addition, the offset value may be changed based on whether the common search space for the corresponding UE is configured in the legacy PDCCH area located in the control region or in an EPDCCH area. For example, when the common search space (CSS) of the legacy PDCCH is reused, 16 (e.g., the number of CCEs forming the corresponding legacy PDCCH) may be added to the offset value.

Various embodiments associated with an implicitly determined parameter $n_{implicit}$, an explicitly determined parameter $N_{explicit}^{(k)}$, and an implicitly determined offset $offset_i$, which are components for a PUCCH resource determination used when antenna port-based PUCCH resource mapping is executed for HARQ ACK/NACK feedback, have been described.

In this instance, the control information transmission method and resource mapping method of the present disclosure, and an apparatus thereof may include all or a part of possible combinations of the components for a PUCCH resource determination used when antenna port-based PUCCH resource mapping is performed for HARQ ACK/NACK feedback.

In particular, ECCE indexing may be performed separately for each EPDCCH set. The lowest ECCE index of an ECCE through which downlink scheduling information is transmitted may be applied as an implicitly determined parameter $n_{implicit}$, which is one of the components for a PUCCH resource determination.

Embodiments of a PUCCH resource mapping method have been described with reference to Equation 5 and Equation 6. Hereinafter, another embodiment of a PUCCH resource mapping method will be described with reference to Equations 7 to 10.

In the present disclosure, a function for PUCCH resource mapping may be expressed as an equation including an implicitly determined parameter $n_{implicit}$ (corresponding to $n_{CCE}$ of Equations 3 and 4) determined by an ECCE and an explicitly determined parameter $N_{explicit}^{(k)}$ (a modification parameter for $N_{PUCCH}^{(1)}$ of Equations 3 and 4), which is similar scheme to above described Equation 3 and Equation 4. That is, an antenna port-based PUCCH resource may be determined based on the following Equations 7 and 8.

$$n_{PUCCH}^{(1,\tilde{p}0)} = n_{implicit} + N_{explicit}^{(k)} \quad \text{[Equation 7]}$$

$$n_{PUCCH}^{(1,\tilde{p}0)} = n_{implicit} + 1 + N_{explicit}^{(k)} \quad \text{[Equation 8]}$$

In addition, the function for PUCCH resource mapping may be determined by further including an additional implicitly determined offset (explicitly determined offset) $offset_{implicit}$ and an explicitly determined offset $offset_{explicit}^{(k)}$, as shown in Equations 9 and 10.

$$n_{PUCCH}^{(1,\tilde{p}0)} = N_{implicit} + N_{explicit}^{(k)} + offset_{implicit} + offset_{explicit}^{(k)} \quad \text{[Equation 9]}$$

$$n_{PUCCH}^{(1,\tilde{p}0)} = n_{implicit} + 1 + N_{explicit}^{(k)} + offset_{implicit} + offset_{explicit}^{(k)} \quad \text{[Equation 10]}$$

Hereinafter, embodiments of respective parameters ($n_{implicit}$, $N_{explicit}^{(k)}$, $offset_{implicit}$ and $offset_{explicit}^{(k)}$) will be described.

$N_{explicit}^{(k)}$ Embodiment

First, $N_{explicit}^{(k)}$ will be described. $N_{explicit}^{(k)}$ is determined explicitly, and the explicit information may be transferred through higher layer signaling (explicitly determined, higher layer configured parameter, $N_{explicit}^{(k)}$).

$N_{explicit}^{(k)}$ is an explicitly determined parameter, corresponds to a value corresponding to $N_{PUCCH}^{(1)}$ of Equations 3 and 4 ($N_{PUCCH}^{(1)}$ is a UE-specific parameter, set through higher layer signaling, and is applied as an offset for PUCCH format 1/1a/1b resource allocation and determines a point where a dynamically allocated PUCCH area beings.), and is applied as an offset for resource allocation and determines a point where a PUCCH area beings. In this respect, $N_{explicit}^{(k)}$ may be referred to as a PUCCH resource starting offset indication value, and higher layer signaling including $N_{explicit}^{(k)}$ is referred to as resource starting offset indication information.

According to the typical technology, for a UE receiving downlink scheduling information (DL scheduling grant) with respect to a PDSCH transmission through a legacy PDCCH, an Radio Resource Control (RRC) parameter $N_{PUCCH}^{(1)}$ transmitted through cell-specific higher layer signaling from a base station for the uplink HARQ ACK/NACK resource mapping may be equally applied to all the UEs in a corresponding cell. In the present disclosure, in the uplink HARQ ACK/NACK resource mapping method for a UE configured to receive downlink scheduling information (DL scheduling grant) associated with a PDSCH transmission through an EPDCCH, as a first method of determining a value corresponding to $N_{explicit}^{(k)}$ of Equations 7 to 10, $N_{PUCCH}^{(1)}$ which is a cell-specific RRC parameter for a legacy PDCCH UE, may be reused. In this instance, for a UE configured to receive a DCI through an EPDCCH, $N_{PUCCH}^{(1)}$ included in system information received from a base station may be used when PUCCH resource mapping is performed for uplink HARQ ACK/NACK transmission, in the same manner as a UE that receives a DCI through an existing legacy PDCCH.

As another method of determining $N_{explicit}^{(k)}$, for a UE configured to receive a DCI through an EPDCCH, $N_{explicit}^{(k)}$ may be set for each UE independently through UE-specific higher layer signaling. That is, when the UE is configured to receive a DCI through an EPDCCH, a corresponding T/R point transmits $N_{explicit}^{(k)}$ for the corresponding UE, and the UE applies PUCCH resource mapping based on Equations 7 and 10, based on the same.

As another method of determining $N_{explicit}^{(k)}$, for a UE configured to receive a DCI through an EPDCCH, $N_{explicit}^{(k)}$ explicit may be set for each UE independently through UE-specific higher layer signaling. In this instance, the method separately allocates $N_{explicit}^{(k)}$ for a PDSCH transmission based on downlink scheduling information transmitted through a distributed EPDCCH set (distributed EPDCCH USS (a set of PRBs for distributed EPDCCH transmission)), and $N_{explicit}^{(k)}$ for a PDSCH transmission based on downlink scheduling information transmitted through a localized EPDCCH set (localized EPDCCH USS (a set of PRBs for localized EPDCCH transmission)), instead of using a single $N_{explicit}^{(k)}$ value. That is, two values, $N_{explicit,1}^{(k)}$ and $N_{explicit,2}^{(k)}$ are assigned for a UE, and $N_{explicit,1}^{(k)}$ and $N_{explicit,2}^{(k)}$ are applied, respectively, when a PUCCH resource mapping equation of Equations 7 to 10 is applied with respect to PDSCH allocation through a distributed EPDCCH set for the corresponding UE and PDSCH allocation through a localized EPDCCH set.

As another method of determining $N_{explicit}^{(k)}$, for a UE configured to receive a DCI through an EPDCCH, $N_{explicit}^{(k)}$ may be set for each UE independently, through UE-specific higher layer signaling. In this instance, the method may separately allocate $N_{explicit}^{(k)}$ for a PDSCH transmission based on downlink scheduling information transmitted through a distributed EPDCCH set and $N_{explicit}^{(k)}$ for a PDSCH transmission based on downlink scheduling information transmitted through a localized EPDCCH set, instead of using a single $N_{explicit}^{(k)}$ value. That is, two values, $N_{explicit,1}^{(k)}$ and $N_{explicit,2}^{(k)}$, are assigned for a UE, and $N_{explicit,1}^{(k)}$ and $N_{explicit,2}^{(k)}$ are applied, respectively, when a PUCCH resource mapping equation of Equations 7 to 10 is applied with respect to PDSCH allocation through a distributed EPDCCH set for the corresponding UE and PDSCH allocation through a localized EPDCCH set. In addition, when a plurality of EPDCCH sets formed of one or more resource block pairs (a group of X PRBs, X is greater than or equal to 1 and less than or equal to the number of PRBs in the entire band) is allocated for each EPDCCH transmission type or for a predetermined EPDCCH transmission type for a UE that is configured to receive a DCI through an EPDCCH, a separate UE-specific higher layer signaling parameter $N_{explicit}^{(k)}$ explicit may be allocated for each EPDCCH set. Here, the number of resource block pairs forming a single EPDCCH set may be X=(1), 2, 4, 8 for the localized type and may be X=2, 4, 8, (16) for the distributed type. For example, for a UE (e.g., UE1) configured to receive a DCI through an EPDCCH, $K_L$ EPDCCH sets from EPDCCH set #1 to EPDCCH set #$K_L$, which form a localized EPDCCH search space, may be allocated and $K_D$ EPDCCH sets from EPDCCH set #1 to EPDCCH set #$K_D$, which form a distributed EPDCCH search space, may be allocated. In this instance, $N_{explicit,m}^{(k)}$ (for m=1, . . . , $K_L$) may be separately allocated for each localized type EPDCCH set #m (for m=1, . . . , $K_L$). In the same manner, $N_{explicit,n}^{(k)}$ (for n=1, . . . , $K_D$) may be separately allocated for each distributed type EPDCCH set #n (for n=1, . . . , $K_D$). That is, when a total of P(P=$K_L$+$K_D$) EPDCCH sets, including $K_L$ localized type EPDCCH sets and $K_D$ distributed type EPDCCH sets, are allocated for a UE, P higher layer configured parameters $N_{explicit,P}^{(k)}$ (p=1, . . . , $K_L$+$K_D$) for PUCCH resource mapping for each set, for the corresponding UE, may be allocated through UE-specific RRC signaling.

In this instance, the corresponding UE may apply a corresponding $N_{explicit,P}^{(k)}$ value to an EPDCCH set through which downlink scheduling information associated with PDSCH resource allocation is transmitted, for PUCCH resource mapping for uplink HARQ ACK/NACK feedback with respect to a corresponding PDSCH transmission.

$n_{implicit}$ Embodiment

An embodiment of $n_{implicit}$, which is another parameter used in Equations 7 to 10, will be described. $n_{implicit}$ may be implicitly determined (implicitly determined parameter).

$N_{PRB}$ denotes the number of downlink resource block pairs Physical Resource Blocks (PRB) forming a system bandwidth supported by a cell formed by a communication common carrier. In this instance, an EPDCCH transmitted through a corresponding PDSCH area may be roughly classified into a localized EPDCCH transmission and a distributed EPDCCH transmission. Accordingly, an ECCE structure and the number of resource elements (REs) forming a single ECCE may be changed based on an EPDCCH transmission type. In the present disclosure, the number of REs forming an ECCE for the localized EPDCCH transmission is $N_{ECCE,L}$, and the number of REs forming an ECCE for the distributed EPDCCH transmission is $N_{ECCE,D}$. In this instance, when a maximum number of REs available for EPDCCH transmission in a single PRB or VRB (Virtual Resource Block) is $N_{RE,RE}$, the number of ECCEs that may be transmitted through the corresponding PRB (or VRB) may be $[N_{RE,RE}/N_{ECCE,L}]$ in the case of the localized EPDCCH transmission, and may be $[N_{RB,RE}/N_{ECCE,D}]$ in the case of the distributed EPDCCH transmission. That is, when a minimum number of REs is used for another downlink physical signal and physical channel in the corresponding PRB (or VRB), a maximum number of ECCEs that may be transmitted through the corresponding PRB is $[N_{RB,RE}/N_{ECCE,L}]$ or $[N_{RB,RE}/N_{ECCE,D}]$, depending on the described EPDCCH transmission type.

Accordingly, when the lowest PRB (or VRB) index of RBs(or VRBs) used for EPDCCH transmission for a UE is $n_{PRB}$, as $n_{implicit}$ for PUCCH resource mapping for uplink HARQ ACK/NACK feedback, $n_{PRB}*[N_{RB,RE}/N_{ECCE,L}]$ may be used when a corresponding EPDCCH corresponds to a localized EPDCCH transmission and $n_{PRB}*[N_{RB,RE}/N_{ECCE,D}]$ may be used when a corresponding EPDCCH corresponds to a distributed EPDCCH transmission.

$n_{implicit}$ may be determined based on a function of the number of blind decoding operations attempted until the corresponding downlink scheduling information is received. For example, when the corresponding downlink scheduling information is received through an $N^{th}$ blind decoding of the UE, N may be applied as $n_{implicit}$.

To this end, a blind decoding procedure of a UE configured to receive a DCI through an EPDCCH, needs to be defined. As an EPDCCH blind decoding procedure of the corresponding UE, an EPDCCH transmission type dependent blind decoding method may be defined. When both of a distributed EPDCCH search space and a localized EPDCCH search space are set for a UE (for which an EPDCCH is configured), blind decoding with respect to the distributed EPDCCH search space is performed first. Then blind decoding with respect to the localized EPDCCH search space is performed. In this instance, the UE performs blind decoding with respect to the distributed EPDCCH search space, in order of ECCE aggregation level 1, 2, 4, 8, and the like and moves to the localized EPDCCH search space and executes blind decoding in order of ECCE aggregation level 1, 2, 4, 8, and the like. Alternatively, the method may be defined to perform blind decoding with respect to the localized EPDCCH search space first.

As another method, an aggregation level dependent blind decoding method may be defined. In this instance, blind decoding may be executed in order of ECCE aggregation level 1, 2, 4, 8, and the like. That is, when both of a distributed EPDCCH search space and a localized EPDCCH search space are set for a UE, the method may be defined to perform blind decoding with respect to aggregation level 1 of the distributed EPDCCH search space and to execute blind decoding with respect to aggregation level 1 of the localized EPDCCH transmission type, and in the same manner, to execute blind decoding with respect to aggregation levels 2, 4, 8, and the like, in order from a low aggregation level to a high aggregation level. Alternatively, in reversal order, the method may be defined to execute blind decoding on a high aggregation level first.

In this instance, the order of a corresponding blind decoding is applied only to downlink scheduling information, the order is assigned with respect to DCI format 1A, which is fallback downlink scheduling information (fallback DL scheduling grant) of the downlink scheduling information, based on the above described rule, and subsequently, the order is assigned with respect to a PDSCH transmission mode dependent DCI format.

For a UE configured to receive a DCI through an EPDCCH, ECCE indexing is performed for each UE in a UE-specifically set search space, and the lowest ECCE index of a control channel element through which the downlink scheduling information is transmitted may be applied as $n_{implicit}$. ECCE indexing for the above, may define an index for each EPDCCH transmission type-based search space. That is, as EPDCCH search space for a UE, M resource block pairs PRB(s) are assigned as a distributed EPDCCH search space and L PRB(s) are assigned as a localized EPDCCH search space, the number $n_{ECCE,D}$ of ECCEs generated in the distributed EPDCCH search space is determined based on M and the number $n_{ECCE,L}$ of ECCEs generated in the localized EPDCCH search space is determined based on L. Accordingly, as the ECCE indexing method of the corresponding UE, the ECCE indexing method may be defined to index ECCEs of the distributed EPDCCH search space with 0 to $(n_{ECCE,D}-1)$, and to index ECCEs of the localized EPDCCH search space with $n_{ECCE,D}$ to $(n_{ECCE,D} \, n_{ECCE,L}-1)$.

As another example, ECCE indexing with respect to the distributed EPDCCH search space and the localized EPDCCH search space may be performed separately. In this instance, ECCE indices from 0 to $(n_{ECCE,D}-1)$ may be defined for the ECCEs of the distributed EPDCCH search space, and separately, ECCE indices from 0 to $(n_{ECCE,L}-1)$ may be defined with respect to the ECCEs of the localized EPDCCH search space.

For a UE configured to receive a DCI through an EPDCCH, ECCE indexing is executed for each UE in a UE-specifically configured search space, and the lowest ECCE index of a control channel element through which the downlink scheduling information is transmitted may be applied as $n_{implicit}$.

As an ECCE indexing method for the above, for a UE configured to receive a DCI through an EPDCCH, ECCE indexing may be performed based on a resource block(s) allocated for transmission of EPDCCH for the corresponding UE and an EPDCCH transmission type in the corresponding resource block(s).

For example, when the total number of localized ECCEs that may be transmitted through a single PRB is $L_{max}$, $L_{max}$ is determined to be $L_{max}=[N_{RB,RE}/N_{ECCE,L}]$.

On the assumption of the above, when consecutive k PRBs (or VRBs) from PRB(or VRB) #n to PRB(or VRB) #(n+k−1) are allocated for the localized EPDCCH transmission for a UE and the number of localized ECCEs defined through the k PRBs(or VRBs) is $K_{eCCE,L}(\leq k \cdot L_{max})$, localized ECCE indices of the corresponding PRBs (or VRBs) may be indexed with $n \cdot L_{max} \sim (n \cdot L_{max} + K_{eCCE,L}-1)$, sequentially from the lowest ECCE.

Conversely, when m number of distributed or consecutive PRBs (or VRBs) are allocated for the distributed EPDCCH transmission of the corresponding UE and the number of distributed ECCEs defined through the corresponding PRBs is $K_{eCC,D}(\leq m \cdot L_{max})$, distributed ECCE indices of the corresponding PRBs (or VRBs) are indexed with 0 to $(K_{ECCE,D}-1)$, sequentially from the lowest ECCE.

For a UE configured to receive a DCI through an EPDCCH, the lowest PRB (or VRB) index of PRBs(or VRBs) used for EPDCCH transmission for the corresponding UE, may be applied as corresponding $n_{implicit}$.

offset$_{implicit}$ Embodiment

An embodiment of offset$_{implicit}$, which is a parameter used in Equations 9 to 10, will be described (implicitly determined offset, offset$_{implicit}$).

offset$_{implciti}$ is an implicitly determined offset value. offset$_{implicit}$ may be introduced to an uplink HARQ ACK/NACK PUCCH resource mapping function for a UE configured to receive a DCI through an EPDCCH, in addition to $n_{implicit}$ (implicitly determined parameter) and $N_{explicit}^{(k)}$ (explicitly determined parameter). As described above, when offset$_{implicit}$ is introduced, the corresponding value may be determined based on a value of a function that uses, as a parameter, a subset of parameters, such as a DM RS (Demodulation Reference Signal) antenna port number of the lowest ECCE through which downlink scheduling information for the corresponding UE is transmitted, an aggregation level, a C-RNTI (cell Radio Network Temporary Identifier) of the corresponding UE, a system bandwidth of a corresponding cell, the number $N_{PRB}$ of resource block pairs, and the like.

As an example, a hashing function may be reused for determining UE-specific search space of a UE for each aggregation level of an existing legacy PDCCH. In this instance, in the hashing function $L\{(Y_k+m')\bmod \lfloor N_{CCE,k}/L\rfloor\}+i$ that determines a search space of a UE based on an aggregation level, only the total number $N_{CCE,K}$ of CCEs of a PDCCH of a subframe k may be replaced with $N_{PRB}$.

As another method, when a DM RS port of an EPDCCH for the corresponding UE is p, $offset_{implicit}$ may be determined based on the same. As an example, the following Equation 5 may be applied.

$$offset_{implicit} = p - 107 \qquad \text{[Equation 11]}$$

p∈(107,108,109,110) in Equation 11.

$offset_{explicit}^{(k)}$ Embodiment

An embodiment of $offset_{explicit}^{(k)}$, which is a parameter used in Equations 9 to 10, will be described (explicitly determined offset, $offset_{explicit}^{(k)}$).

For a UE configured to receive a DCI through an EPDCCH, an ACK/NACK Resource Indicator (ARI) information area having a size of M bit(s) for the corresponding UE is defined in downlink scheduling information, n $offset_{explicit}^{(k)}$ values (n<=$2^M$) corresponding to respective ARI values are defined as shown in the following Table 3, and a corresponding value may be applied to the corresponding UE based on an ARI value in the corresponding downlink scheduling information. To this end, an information field for setting an ARI may be newly defined in DCI formats (that is, DCI format 1A, 2A, 2B, 2C, and the like) for downlink scheduling information, or an existing information area may be used for the purpose of a corresponding ARI (ACK/NACK resource indication). For example, an existing 2-bit 'TPC command for PUCCH' information area may be used for an ARI.

$offset_{explicit}^{(k)}$ may be defined as a dynamic offset indication value. In comparison with $N_{explicit}^{(k)}$ that is semi-statically determined through higher layer signaling, $offset_{explicit}^{(k)}$ is indicated through control information transmitted to a UE. Thus, this is referred to as a dynamic offset indication value.

Although the present disclosure describes that a size of a corresponding ARI is M=2, it is clear that the identical concept may be applied to another M value.

TABLE 3

| ARI | $offset_{explicit}^{(k)}$ |
|---|---|
| '00' | $offset_{explicit}^{(0)}$ |
| '01' | $offset_{explicit}^{(1)}$ |
| '10' | $offset_{explicit}^{(2)}$ |
| '11' | $offset_{explicit}^{(3)}$ |

As a method of determining the n explicitly determined offset parameters $offset_{explicit}^{(k)}$, the present disclosure provides the following three methods.

First, a method of determining $offset_{explicit}^{(k)}$ through downlink scheduling information is provided. explicitly determined parameters $offset_{explicit}^{(0)}$, $offset_{explicit}^{(1)}$ ..., and $offset_{explicit}^{(n-1)}$ are set to be UE-specific, through UE-specific higher layer signaling for a UE configured to receive a DCI through an EPDCCH. For example, a 2-bit ARI is applied, 4 offset values or 3 offset values excluding 0 which is a default offset value, are set for each UE through UE-specific higher layer signaling, as shown in the following Table 4 or 5, and a different $offset_{explicit}^{(k)}$ value may be applied for each UE, based on an ARI.

TABLE 4

| ARI | $offset_{explicit}^{(k)}$ |
|---|---|
| '00' | The 1$^{st}$ offset value configured by the higher layers, $offset_{explicit}^{(0)}$ |
| '01' | The 2$^{nd}$ offset value configured by the higher layers, $offset_{explicit}^{(1)}$ |
| '10' | The 3$^{rd}$ offset value configured by the higher layers, $offset_{explicit}^{(2)}$ |
| '11' | The 4$^{th}$ offset value configured by the higher layers, $offset_{explicit}^{(3)}$ |

TABLE 5

| ARI | $offset_{explicit}^{(k)}$ |
|---|---|
| '00' | 0 |
| '01' | The 1$^{st}$ offset value configured by the higher layers, $offset_{explicit}^{(1)}$ |
| '10' | The 2$^{nd}$ offset value configured by the higher layers, $offset_{explicit}^{(2)}$ |
| '11' | The 3$^{rd}$ offset value configured by the higher layers, $offset_{explicit}^{(3)}$ |

As another method of determining $offset_{explicit}^{(k)}$ through downlink scheduling information of a UE, a method of fixing an ARI-based offset value and applying an identical value to all UEs, may be provided. In this instance, as a method of effectively allocating a PUCCH resource by minimizing a collision between a UE receiving a DCI through an EPDCCH and a UE receiving a DCI through a legacy PDCCH, remaining values 3,5,6, and 7 excluding an aggregation level that is applied for link adaptation, may be used as a corresponding ARI-based offset value. That is, 3,5,6, and 7 may be applied as an ARI-based offset value as shown in the following Table 6, or remaining values 3,5, and 7 excluding an even number 6 from among aggregation levels 3, 5, 6, and 7, are applied as 3 offset values remaining after excluding the default offset value, as shown in the following Table 7.

TABLE 6

| ARI | $offset_{explicit}^{(k)}$ |
|---|---|
| '00' | 3 |
| '01' | 5 |
| '10' | 6 |
| '11' | 7 |

TABLE 7

| ARI | $offset_{explicit}^{(k)}$ |
|---|---|
| '00' | 0 |
| '01' | 3 |
| '10' | 5 |
| '11' | 7 |

3, 5, 6, and 7 as $offset_{explicit}^{(k)}$ are merely examples, and the following table may be used as another example of $offset_{explicit}^{(k)}$.

TABLE 8

| ACK/NACK Resource offset field in DCI format 1A/1B/1D/1/2A/2/2B/2C/2D | $\Delta_{ARO}$ |
|---|---|
| 0 | −2 |
| 1 | −1 |
| 2 | 0 |
| 3 | 2 |

Here, an ACK/NACK Resource offset field corresponds to an ARI field, and $\Delta_{ARO}$ is a value identical to offset$_{explicit}^{(k)}$.

As another method of determining offset$_{explicit}^{(k)}$ through downlink scheduling information of a UE, a method of fixing an ARI-based offset value, and using a different ARI-based offset mapping table based on an aggregation level of an EPDCCH through which corresponding downlink scheduling information is transmitted, may be provided. That is, the method defines an ARI-offset$_{explicit}^{(k)}$ mapping table for aggregation level 1, an ARI-offset$_{explicit}^{(k)}$ mapping table for aggregation level 2, an ARI-offset$_{explicit}^{(k)}$ mapping table for aggregation level 4, and an ARI-offset$_{explicit}^{(k)}$ mapping table for aggregation level 8, respectively, and applies offset$_{explicit}^{(k)}$ based on an aggregation level of an EPDCCH for the corresponding downlink scheduling information and an ARI of the corresponding scheduling information. For example, an ARI-offset$_{explicit}^{(k)}$ mapping table may be defined for each aggregation level through the following Tables 9 to 12.

TABLE 9

| ARI | offset$_{explicit}^{(k)}$ |
|---|---|
| '00' | 0 |
| '01' | 6 |
| '10' | 12 |
| '11' | 18 |

TABLE 10

| ARI | offset$_{explicit}^{(k)}$ |
|---|---|
| '00' | 0 |
| '01' | 12 |
| '10' | 24 |
| '11' | 36 |

TABLE 11

| ARI | offset$_{explicit}^{(k)}$ |
|---|---|
| '00' | 0 |
| '01' | 8 |
| '10' | 16 |
| '11' | 24 |

TABLE 12

| ARI | offset$_{explicit}^{(k)}$ |
|---|---|
| '00' | 0 |
| '01' | 16 |
| '10' | 24 |
| '11' | 36 |

In addition, it is clear that the present disclosure includes all cases in which a PUCCH ACK/NACK resource is mapped through a sum of some of the 4 parameters of Equations 7 to 10 provided in the present disclosure, and the corresponding some parameters are configured through a combination of the above described embodiments.

Figure 9:
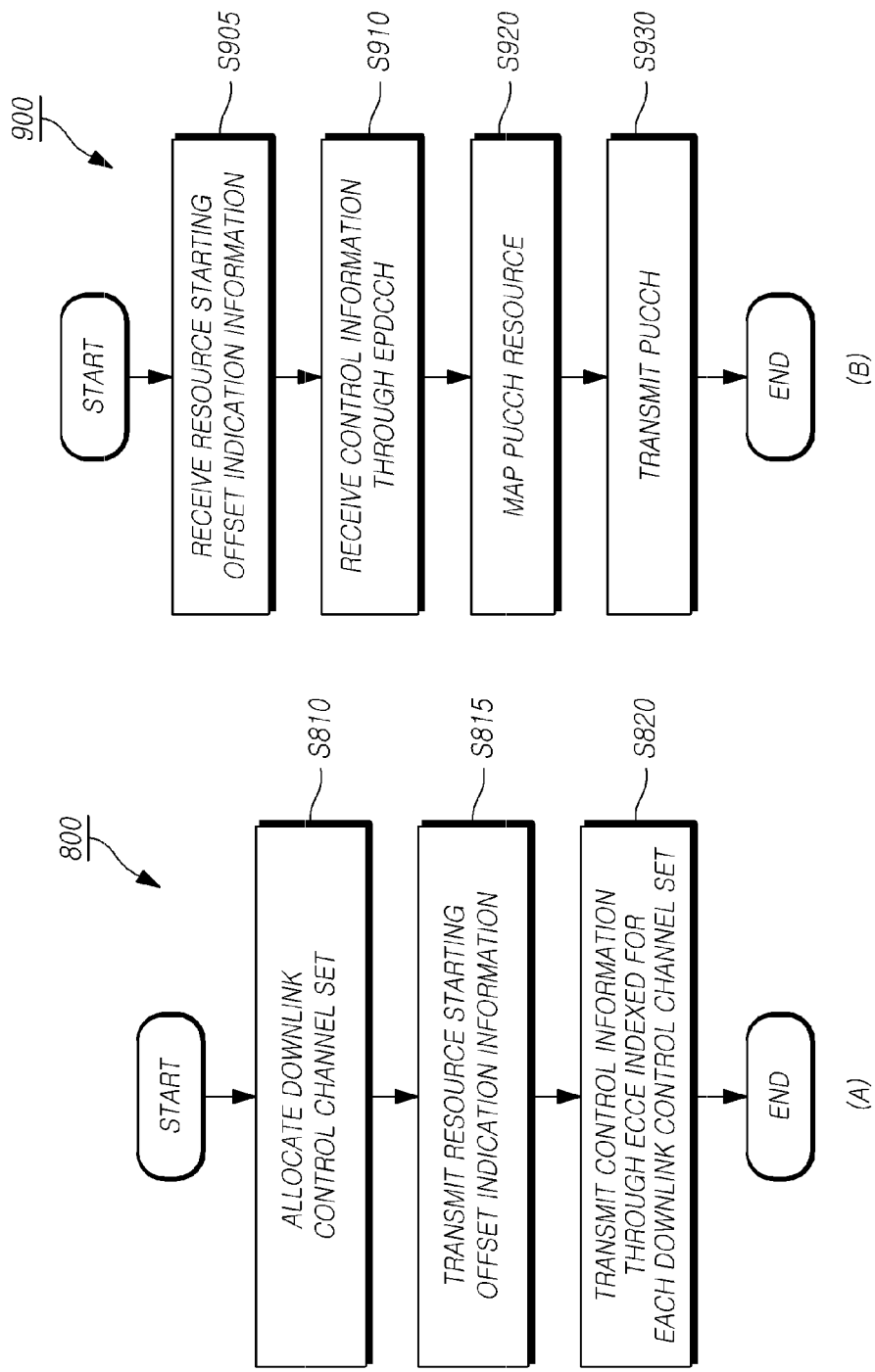
FIG. 9 is a flowchart of a control information transmission method of a Transmission/Reception (T/R) point according to an embodiment of the present disclosure and a flowchart of a PUCCH resource mapping method of a User Equipment (UE) according to another embodiment of the present disclosure.

A diagram (a) of FIG. 9 is a flowchart of a control information transmission method of a T/R point that transmits control information with respect to a predetermined UE through a data region of a resource block pair (Physical Resource Block pair) of a predetermined subframe according to an embodiment of the present disclosure.

Referring to the diagram (a) of FIG. 9, an embodiment of the present disclosure provided from the perspective of a T/R point is a control information transmission method 800 of a T/R point that transmits control information with respect to a UE through a data region of a resource block pair (Physical Resource Block Pair) of a subframe. The method includes operation S810 of allocating at least one downlink control channel (e.g., Enhanced Physical Downlink Control Channel (EPDCCH)) set formed of X resource block pairs where X is a natural number greater than or equal to 1 and less than or equal to the number of RBs in the entire band, and operation S815 of transmitting, to the UE, uplink control channel resource starting offset indication information for each of at least one downlink control channel set.

In addition, the control information transmission method 800 of the T/R point includes operation S820 of transmitting control information through at least one control channel element (e.g., Enhanced Control Channel Elements) indexed for each downlink control channel set.

The control information that the T/R point transmits to the UE may include downlink scheduling information, and the control information may be transmitted to the UE through at least one control channel element (e.g., enhanced Control Channel Element (ECCE)) of one of the at least one downlink control channel set (e.g., EPDCCH set).

The lowest index of a control channel element through which the control information is transmitted and the PUCCH resource starting offset indication information transmitted in operation S815 may be used as components for a resource determination when PUCCH resource mapping is performed for ACK/NACK with respect to a Physical Downlink Shared Channel (PDSCH) allocated based on the downlink scheduling information.

Referring again to Equations 7 to 10, the lowest index of a control channel element through which the control information is transmitted may be used as $n_{implicit}$ and the PUCCH resource starting offset indication value may be used as explicit $N_{explicit}^{(k)}$.

The resource starting offset indication information transmitted in operation S815 may be transmitted through higher layer signaling, and the higher layer signaling may be, for example, Radio Resource Control (RRC).

The control information that the T/R point transmits to the UE may include downlink scheduling information, and the downlink scheduling information may include dynamic offset indication information.

offset$_{explicit}^{(k)}$ may be further added in Equations 9 to 10. offset$_{explicit}^{(k)}$ may be defined as a dynamic offset indication value. In comparison with $N_{explicit}^{(k)}$ semi-statically determined through higher layer signaling, offset$_{explicit}^{(k)}$ is indicated through control information transmitted to a UE. Thus, this is referred to as a dynamic offset indication value.

When the dynamic offset indication information is transmitted through the downlink scheduling information, the dynamic offset indication information may be used as another component for resource determination when PUCCH resource mapping is performed for ACK/NACK with respect to a PDSCH allocated based on the downlink scheduling information.

Referring again to Equations 9 to 10, PUCCH resource mapping may be determined based on the four components for resource determination, $n_{implicit}$, $N_{explicit}^{(k)}$, $offset_{implicit}$, and $offset_{explicit}^{(k)}$.

X of X resource block pairs forming a single EPDCCH set may be X=2, 4, 8, (16), (32), but the present embodiment is not limited thereto. In this instance, an EPDCCH set may or may not be formed of a maximum of 16 resource block pairs, based on a type of EPDCCH set. For example, a distributed EPDCCH set may be formed of 16 resource block pairs but a localized EPDCCH set may be formed of a total of 8 resource block pairs.

A diagram (b) of FIG. 9 is a flowchart illustrating a PUCCH resource mapping method of a UE that receives downlink scheduling information through an EPDCCH, according to another embodiment.

Referring to the diagram (b) of FIG. 9, from the perspective of a UE, another embodiment is a PUCCH resource mapping method 900 of the UE. The method includes operation S905 of receiving, from a T/R point, uplink control channel resource starting offset indication information for each of at least one downlink control channel (e.g., Enhanced Physical Downlink Control Channel (EPDCCH)) set formed of X resource block pairs of a subframe. Here, X is a natural number greater than or equal to 1. The resource starting offset indication information may be received through higher layer signaling (for example, RRC).

In addition, the PUCCH resource mapping method 900 of the UE includes operation S910 of receiving, from the T/R point, control information associated with downlink scheduling information through at least one control channel element (e.g., Enhanced Control Channel Elements) indexed for each downlink control channel, and operation S920 of mapping a PUCCH resource using the uplink control channel resource starting offset indication information and the lowest index of a control channel element as components for resource determination, when PUCCH resource mapping is performed for ACK/NACK with respect to a PDSCH (Physical Downlink Shared Channel) allocated based on the downlink scheduling information. The PUCCH resource mapping method 900 of the UE according to another embodiment may further include operation S930 of transmitting a PUCCH of which PUCCH resource is mapped in operation S920, to the T/R point.

As described above, X of X resource block pairs forming a single EPDCCH set may be X=2,4,8, (16), (32), but the present embodiment is not limited thereto. In this instance, an EPDCCH set may or may not be formed of a maximum of 16 resource block pairs, based on a type of EPDCCH set. For example, a distributed EPDCCH set may be formed of 16 resource block pairs but a localized EPDCCH set may be formed of a total of 8 resource block pairs.

Figure 10:
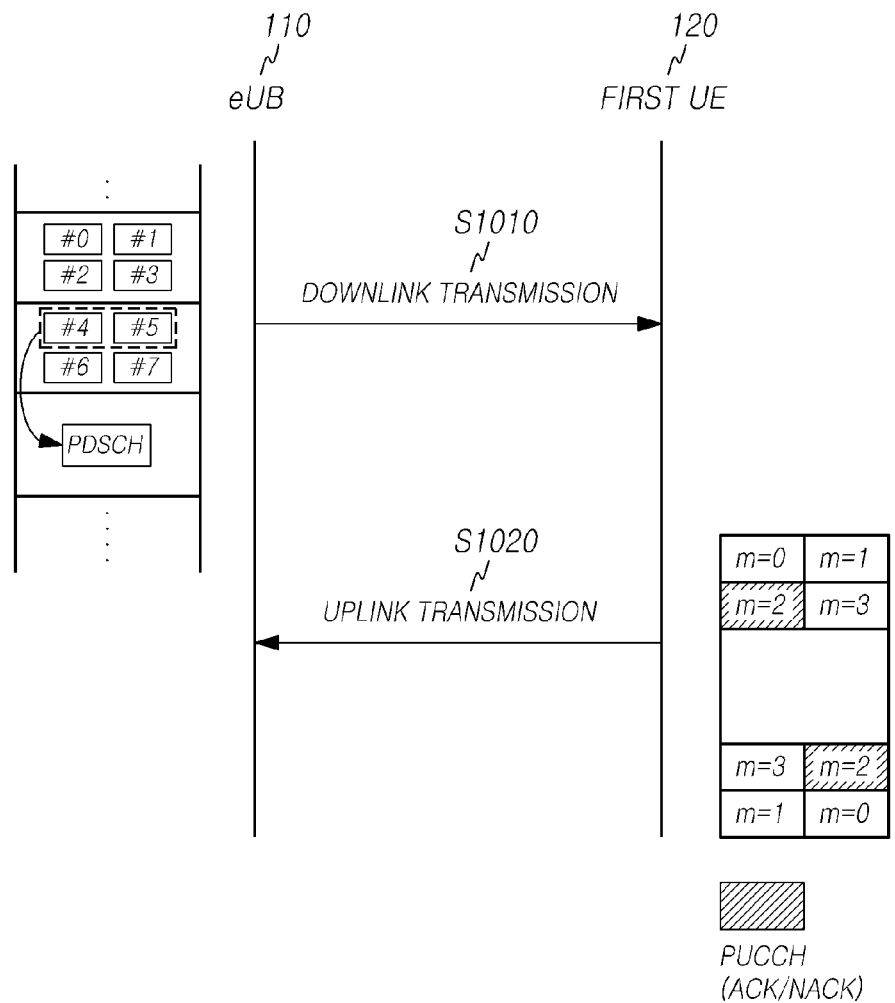
FIG. 10 is a flowchart illustrating downlink transmission of a T/R point and uplink transmission of a UE.

FIG. 10 is a flowchart illustrating downlink transmission of a T/R point and an uplink transmission of a UE.

Referring to FIG. 10, although a downlink transmission S1010 is illustrated as being performed by the eNB 110 first in FIG. 10, the present embodiment is not limited thereto. For example, the eNB 110 may transmit information associated with configuration parameters to the first UE 120 through higher layer signaling before the downlink transmission S1010.

For example, the eNB 110 may transmit information associated with an explicitly determined parameter $N_{explicit}^{(k)}$ according to the $N_{explicit}^{(k)}$ embodiment, to the first UE 120 through higher layer signaling, or may transmit, to the first UE 120, information associated with an additional explicitly determined offset $offset_{explicit}^{(k)}$ according to the $offset_{explicit}^{(k)}$ embodiment.

In addition, in association with the above described parameters $n_{implicit}$, $N_{explicit}^{(k)}$, $offset_{implicit}$, and $offset_{explicit}^{(k)}$, configuration parameter information transmitted to the first UE 120 through the higher layer signaling may be transmitted before operation S1010.

In operation S1010, a T/R point (e.g., the eNB 110) may transmit, to the first UE 120, control information including downlink scheduling information and a PDSCH indicated by the downlink scheduling information, through an EPDCCH of a data region of a resource block pair (Physical Resource Block pair) of a subframe.

In this instance, as described with reference to FIG. 9, to transmit the control information including the downlink scheduling information through an EPDCCH of a data region of a resource block pair (e.g., Physical Resource Block pair) of a predetermined subframe, the eNB 110 may allocate at least one localized EPDCCH set formed of X physical resource block pairs, for example, two physical resource block pairs of the predetermined subframe. In this instance, as described with reference to FIG. 8, n localized EPDCCH sets and m distributed EPDCCH sets may be allocated EPDCCH sets. However, for ease of description, descriptions are provided based on a case in which at least one localized EPDCCH set is allocated.

Subsequently, the eNB 110 indexes at least two control channel elements (e.g., Enhanced Control Channel Elements) for each set. For example, ECCEs forming a localized EPDCCH set may be indexed separately with respect to at least one localized EPDCCH set formed of two physical resource block pairs. As described with reference to FIG. 8, indexing ECCEs for each EPDCCH set when n localized EPDCCH sets and m distributed EPDCCH sets are allocated, has been described with reference to FIG. 8.

Subsequently, control information may be allocated to at least one of the indexed control channel elements, for example, ECCE #4 and ECCE #5, as described with reference to FIG. 10, and the control information may be transmitted to a predetermined UE. In this instance, when the control information includes downlink scheduling information, a PDSCH indicated by the downlink scheduling information may be transmitted to the first UE 120 in a downlink, in operation S1010.

From the perspective of a UE, in operation S1010, the first UE 120 receives control information including downlink scheduling information and a PDSCH indicated by the downlink scheduling information, through an EPDCCH from the eNB 110.

Subsequently, the first UE 120 may transmit scheduling request (SR), Hybrid ARQ (HARQ)-ACK with respect to a received downlink data channel transmission block, and a report of a UE in association with a downlink channel state, through a PUCCH, and may transmit uplink data through a PUSCH in an uplink, in operation S1020. In this instance, the UE 120 may perform an uplink transmission to the eNB 110 which is a first T/R point, as illustrated in FIG. 2. In addition, the second UE 122 may perform uplink transmission to the RRH 112 which is a second T/R point, as illustrated in FIG. 3.

In this instance, a scheme of mapping control information in a Resource Block (RB) for each PUCCH format has been described with reference to FIG. 4.

In operation S1020, when the UE 120 perform antenna port-based PUCCH resource mapping for HARQ ACK/

NACK feedback with respect to corresponding PDSCH reception of a UE for which PDSCH allocation information is transmitted through reception of downlink scheduling information through an EPDCCH allocated to the data region 120 of a resource block, components for a PUCCH resource determination may include an implicitly determined parameter $n_{implicit}$ (corresponding to $n_{CCE}$ of Equations 3 and 4), determined by an ECCE, an explicitly determined parameter $N_{explicit}^{(k)}$ ($N_{PUCCH}^{(1)}$ of Equations 3 and 4), and an implicitly determined offset offset$_i$. As described in the above example, the antenna port-based PUCCH resource mapping for HARQ ACK/NACK feedback with respect to the corresponding PDSCH reception may be determined by Equation 5 and Equation 6.

Alternatively, in operation S1020, an ACK/NACK Resource Indicator (ARI) information field is defined in downlink scheduling information. Thus, the first UE 120 may receive dynamic offset indication information through this field. As described in the offset$_{explicit}^{(k)}$ embodiment, the first UE 120 may determine a dynamic offset value through the ARI information field, with reference to offset$_{explicit}^{(k)}$ table information (for example, Tables 4 to 5) transferred through higher layer signaling or fixed offset value table information (Tables 6 to 11).

In addition, in operation S1020, when the UE 120 perform antenna port-based PUCCH resource mapping for HARQ ACK/NACK feedback with respect to corresponding PDSCH reception of a UE for which PDSCH allocation information is transmitted through reception of downlink scheduling information through an EPDCCH allocated to the data region of a resource block, components for a PUCCH resource determination may include an implicitly determined parameter $n_{implicit}$ (corresponding to $n_{CCE}$ of Equations 3 and 4), determined by an ECCE, an explicitly determined parameter $N_{explicit}^{(k)}$ ($N_{PUCCH}^{(1)}$ of Equations 3 and 4), an additional explicitly determined offset parameter (explicitly determined offset, $N_{PUCCH}^{(1)}$) and an additional implicitly determined offset parameter (implicitly determined offset, offset$_{implicit}$. As described in the above example, the antenna port-based PUCCH resource mapping for HARQ ACK/NACK feedback with respect to the corresponding PDSCH reception may be determined by Equation 7 to Equation 10.

At least one of two control channel elements (e.g., Enhanced Control Channel Elements) indexed for each set, for example, when a corresponding antenna port-based PUCCH resource mapping is performed for HARQ ACK/NACK feedback with respect to reception of a PDSCH indicated by downlink scheduling information included in control information received through ECCEs #4 and #5, as illustrated in FIG. 10, the lowest index of ECCEs, for example, ECCE #4, may be used as a component, and PUCCH resource mapping is performed using the same. For example, when ECCE #4 is used as an implicitly determined parameter of Equations 5 and 6, a PUCCH may be mapped to a PUCCH resource m=2.

Figure 11:
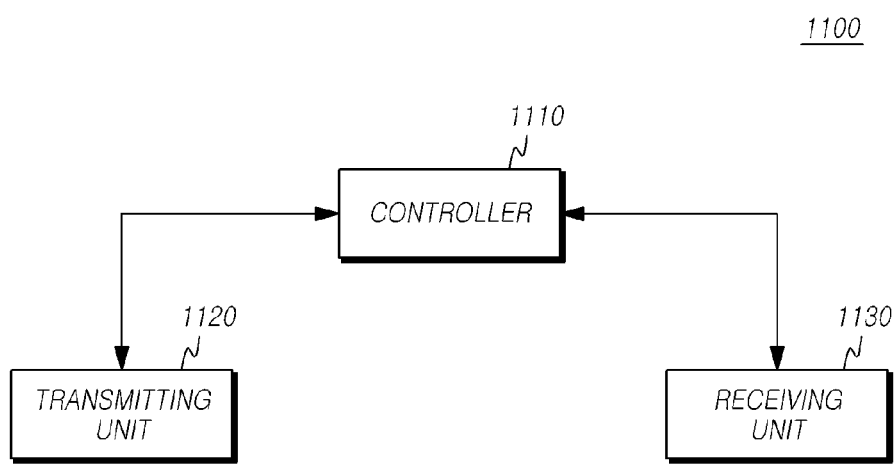
FIG. 11 is a diagram illustrating a T/R point according to another embodiment of the present disclosure.

FIG. 11 is a diagram illustrating a transmission/reception point according to another embodiment of the present disclosure.

Referring to FIG. 11, a T/R point 1100 according to another embodiment may include a controller 1110, a transmitting unit (e.g., transmitter) 1120, and a receiving unit (e.g., receiver) 1130.

The controller 1110 controls general operations of a base station in association with a PUCCH resource mapping method for feeding back an uplink HARQ ACK/NACK, for a UE that is configured to receive a DCI through an EPDCCH, which is required for implementing the present disclosure.

The controller 1110 allocates at least one downlink control channel (e.g., Enhanced Physical Downlink Control Channel (EPDCCH)) set that is formed of X resource block pairs of a subframe (X is a natural number greater than or equal to 1 and less than or equal to the number of PRBs) when a T/R point that transmits control information with respect to a predetermined UE through a data region of a resource block pair (Physical Resource Block Pair) of a subframe. The controller 1110 performs indexing at least two control channel elements (e.g., Enhanced Control Channel Elements) for each downlink control channel set and allocates control information to at least one of the indexed control channel elements.

As described above, X of X resource block pairs forming a single EPDCCH set may be X=2,4,8, (16), (32), but the present embodiment is not limited thereto. In this instance, an EPDCCH set may or may not be formed of a maximum of 16 resource block pairs, based on a type of EPDCCH set. For example, a distributed EPDCCH set may be formed of 16 resource block pairs but a localized EPDCCH set may be formed of a total of 8 resource block pairs.

The transmitting unit (e.g., transmitter) 1120 and the receiving unit (e.g., receiver) 1130 may be used for transmitting and receiving a signal, a message, and data required for implementing the above described present disclosure, to/from a UE. For example, the transmitting unit 1120 transmits the control information to a predetermined UE through an EPDCCH of a data region of a resource block pair (Physical Resource Block pair) of a predetermined sub frame.

The base station 1100 shown in FIG. 11 may perform all the functions of a base station in the embodiments of the present disclosure, which have been described through the $n_{implicit}$ embodiment, the $N_{explicit}^{(k)}$ embodiment, the offset$_{implicit}$ embodiment, and the offset$_{explicit}^{(k)}$ embodiment, using the controller 1110, the transmitting unit 1120, and the receiving unit 1130.

As an example of performing one of the embodiments of the present disclosure, the base station 1100 performing the $N_{explicit}^{(k)}$ embodiment will be described in detail.

The controller 1110 may allocate at least one downlink control channel (e.g., enhanced Physical Downlink Control Channel) set that is formed of X resource block pairs of a subframe, where X is greater than or equal to 1 and less than or equal to the number of PRBs of the entire band. Here, X is one of 2, 4, 8, and 16).

The transmitting unit 1120 may transmit uplink control channel resource starting offset indication information to a UE, for each of the at least one downlink control channel set (e.g., EPDCCH set).

Figure 8:
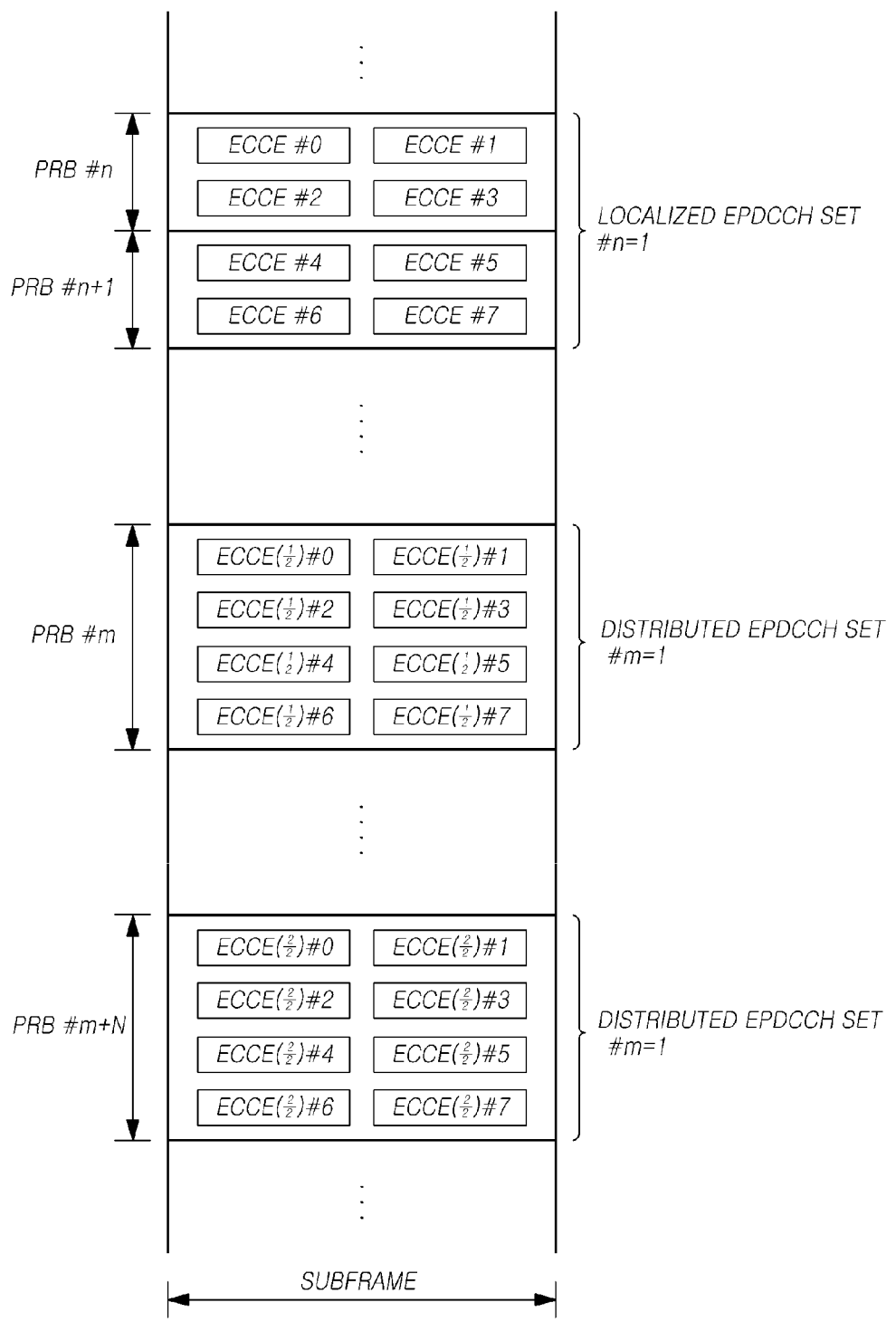
FIG. 8 illustrates a single localized-type EPDCCH set having $K_L=1$ and a single distributed-type EPDCCH set having $K_D=1$ when X=2 and N=4.

The uplink control channel resource starting offset indication information may be information associated with $N_{explicit}^{(k)}$, that has been described with reference to Equations 7 to 10, FIGS. 8 to 10, and the $N_{explicit}^{(k)}$ embodiment.

The transmitting unit 1120 may transmit the uplink control channel resource starting offset indication information through higher layer signaling (for example, RRC).

The transmitting unit 1120 may transmit control information to a UE through a data region of a resource block pair of a subframe. The control information may include downlink scheduling information. The control information may be transmitted through at least one control channel element (e.g., enhanced Control Channel Element (ECCE)) of one of at least one downlink control channel set (EPDCCH set), which has been described in the description of the controller 1110.

The uplink control channel resource starting offset indication information transmitted by the transmitting unit 1120 and the lowest index of a control channel element through which the control information is transmitted may be used as components for resource determination when uplink control channel resource mapping is performed for ACK/NACK with respect to a Physical Downlink Shared Channel (PDSCH) allocated based on the downlink scheduling information.

The downlink scheduling information transmitted by the transmitting unit 1120 may include dynamic offset indication information.

The dynamic offset indication information may be information associated with $\text{offset}_{explicit}^{(k)}$, which has been described with reference to Equations 9 to 10, FIG. 10, and the $\text{offset}_{explicit}^{(k)}$ embodiment.

The transmitting unit 1120 may define an ARI field in downlink scheduling information and may transmit dynamic offset indication information through this field. The transmitted dynamic offset indication information may be used as another component for resource determination when uplink control channel resource mapping is performed for ACK/NACK with respect to a Physical Downlink Shared Channel (e.g., PDSCH) allocated based on downlink scheduling information.

Figure 12:
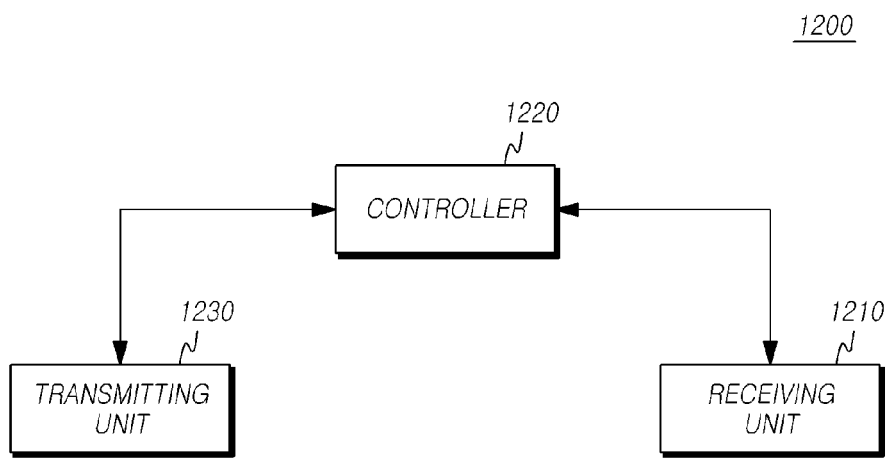
FIG. 12 is a diagram illustrating a UE according to another embodiment.

FIG. 12 is a diagram illustrating a UE according to another embodiment.

Referring to FIG. 12, a UE 1200 according to another embodiment may include a receiving unit (e.g., receiver) 1210, a controller 1220, and a transmitting unit (e.g., transmitter) 1230.

The receiving unit 1210 may receive, from a base station, downlink control information, downlink data, a message, through a corresponding channel. The receiving unit 1210 receives, from a T/R point, control information associated with downlink scheduling information through one of at least two control channel elements (Enhanced Control Channel Elements) indexed for each downlink control channel set with respect to at least one downlink control channel (Enhanced Physical Downlink Control CHannel) set formed of X resource block pairs (X is a natural number greater than or equal to 1) of a subframe.

In addition, the controller 1220 controls general operations of a base station in association with a PUCCH resource mapping method for feeding back an uplink HARQ ACK/NACK, for a UE configured to receive a DCI through an EPDCCH, which is required for implementing the present disclosure. The controller 1220 uses the lowest index of a control channel element as a component when executing PUCCH resource mapping is performed for ACK/NACK with respect to a Physical Downlink Shared Channel (PDSCH) allocated based on the downlink scheduling information.

The transmitting unit 1230 may transmit, to a base station, uplink control information, data, a message, through a corresponding channel.

The UE 1200 shown in FIG. 12 may perform all the functions of a UE in the embodiments of the present disclosure, which have been described through the $n_{implicit}$ embodiment, the $N_{explicit}^{(k)}$ explicit embodiment, the $\text{offset}_{implicit}$ embodiment, and the $\text{offset}_{explicit}^{(k)}$ embodiment, using the receiving unit 1210, the controller 1220, and the transmitting unit 1230.

As an example of executing one of the embodiments of the present disclosure, a case in which the UE 1200 executes the $N_{explicit}^{(k)}$ embodiment will be described in detail.

The receiving unit 1210 receives uplink control channel resource starting offset indication information from a T/R point for each of at least one downlink control channel (enhanced Physical Downlink Control Channel) set formed of X resource block pairs (X is a natural number greater than or equal to 1 and less than or equal to the number of PRBs of the entire band) of a subframe. The receiving unit 1210 receives downlink scheduling control information from the T/R point, through at least one control channel element (ECCE, enhanced Control Channel Element) of one of the at least one downlink control channel set (EPDCCH set).

X of X resource block pairs forming a single EPDCCH set may be X=2, 4, 8, (16), (32), but the present embodiment is not limited thereto. In this instance, an EPDCCH set may or may not be formed of a maximum of 16 resource block pairs, based on a type of EPDCCH set. For example, a distributed EPDCCH set may be formed of 16 resource block pairs but a localized EPDCCH set may be formed of a total of 8 resource block pairs.

The uplink control channel resource starting offset indication information may be information associated with $N_{explicit}^{(k)}$, which has been described with reference to Equations 7 to 10, FIGS. 8 to 10, and the $N_{explicit}^{(k)}$ embodiment.

The receiving unit 1210 may receive the uplink control channel resource starting offset indication information through higher layer signaling (for example, RRC).

The controller 1220 controls uplink control channel resource mapping for ACK/NACK with respect to a Physical Downlink Shared Channel (PDSCH) allocated based on downlink scheduling control information. The controller 1220 may perform uplink control channel resource mapping using the received uplink control channel resource starting offset indication information and the lowest index of a control channel element through which control information is received, as components for resource determination.

The downlink scheduling control information may include dynamic offset indication information. The controller 1220 may use the dynamic offset indication information as another component for resource determination and may perform uplink control channel resource mapping.

The dynamic offset indication information may be information associated with $\text{offset}_{explicit}^{(k)}$, which has been described with reference to Equations 9 to 10, FIG. 10, and the $\text{offset}_{explicit}^{(k)}$ embodiment.

The contents associated with the standard, mentioned in the above described embodiments has been omitted to simplify the description of the present specifications, but it may be a part of the present specifications. Therefore, when part of the contents related to the standard is added to the present specifications or is specified in claims, it should be construed as a part of the present disclosure.

Particularly, the documents attached herein are a part of previously publicized documents and constitute a part of the present specifications. Therefore, when part of the contents and documents associated with the standard are added to the present specifications or is specified in claims, it should be construed as a part of the present disclosure.

Although the embodiments of the present disclosure have been described for illustrative purposes, those skilled in the art will appreciate that various modifications, additions and substitutions are possible, without departing from the scope and spirit of the invention. Therefore, exemplary embodiments of the present disclosure have been described for the sake of brevity and clarity. The scope of the present disclosure shall be construed on the basis of the accompanying claims in such a manner that all of the technical ideas included within the scope equivalent to the claims belong to the present disclosure.

CROSS-REFERENCE TO RELATED APPLICATION

This application claims priority from and the benefit under 35 U.S.C. § 119(a) of Korean Patent Application Nos. 10-2012-0085937, filed on Aug. 6, 2012, 10-2012-0089253, filed on Aug. 16, 2012, 10-2012-0089881, filed on Aug. 17, 2012, 10-2012-0093098, filed on Aug. 24, 2012, 10-2012-0093109, filed on Aug. 24, 2012, 10-2012-0132928, filed on Nov. 22, 2012, 10-2012-0145416, filed on Dec. 13, 2012, and 10-2012-0146706, filed on Dec. 14, 2012 which are hereby incorporated by reference for all purposes as if fully set forth herein. Also, when this application claims the priority benefit of the same Korean Patent Applications from countries in addition to the U.S., the disclosure will be incorporated herein by reference.

The invention claimed is:

1. A control information transmission method of a transmission/reception point for transmitting control information with respect to a User Equipment (UE) through a data region of a resource block pair of a subframe, the method comprising:
    allocating, to the UE, at least one of downlink control channel sets each formed of X resource block pairs of the subframe, where the at least one of downlink control channel sets includes a Physical Downlink Control Channel (PDCCH) in the data region and the X is a natural number greater than or equal to 1 and less than or equal to a number of resource blocks (RBs) in the entire band;
    transmitting, to the UE, uplink control channel resource starting offset indication information separately determined for each of the at least one of downlink control channel sets in the data region; and
    transmitting, to the UE, the control information through at least one control channel element indexed for each downlink control channel set,
    wherein:
    the control information includes downlink scheduling information;
    a lowest index of the control channel element through which the control information is transmitted and the uplink control channel resource starting offset indication information are used as components for resource determination when an uplink control channel resource mapping is performed for ACK/NACK with respect to a Physical Downlink Shared Channel (PDSCH) allocated based on the downlink scheduling information;
    the downlink scheduling information includes dynamic offset indication information; and
    the dynamic offset indication information is used as another component for resource determination when the uplink control channel resource mapping is executed for ACK/NACK with respect to the PDSCH allocated based on the downlink scheduling information;
    wherein the X resource block pairs of the subframe are 4, 8, or 16 resource block pairs; and
    wherein each of the at least one of downlink control channel sets is configured to be one of a localized downlink control channel set and a distributed downlink control channel set;
    when the downlink control channel set is configured to be the localized downlink control channel set, resource element groups forming each control channel element are located in a single physical resource block pair; and
    when the downlink control channel set is configured to be the distributed downlink control channel set, resource element groups forming each control channel element are located in two or more physical resource block pairs.

2. The method as claimed in claim 1, wherein:
    each of the control channel elements is formed of one of 4 resource element groups and 8 resource element groups where the control channel elements includes control channel elements in the data region; and
    the 4 resource element groups and the 8 resource element groups forming each control channel element are located in the single physical resource block pair or in the two or more physical resource block pairs.

3. The method as claimed in claim 1, wherein a transmission antenna port of the downlink scheduling information is used as another component for resource determination when the uplink control channel resource mapping is performed for ACK/NACK with respect to the Physical Downlink Shared Channel (PDSCH) allocated based on the downlink scheduling information.

4. The method as claimed in claim 1, wherein the transmitting the uplink control channel resource starting offset indication information includes transmitting the uplink control channel resource starting offset indication information to the UE through higher layer signaling.

5. An uplink control channel resource mapping method of a User Equipment (UE), the method comprising:
    receiving, from a transmission/reception point, uplink control channel resource starting offset indication information separately determined for each of at least one downlink control channel set allocated to the UE, wherein each of the at least one downlink control channel set is formed of X resource block pairs of a subframe, where the downlink control channel includes a Physical Downlink Control Channel (PDCCH) in a data region and X is a natural number greater than or equal to 1 and less than or equal to the number of resource blocks (RBs);
    receiving, from a transmission/reception point, control information associated with downlink scheduling information through at least one control channel element indexed for each downlink control channel set, where the control channel element includes a control channel element in the data region; and
    executing uplink control channel resource mapping for ACK/NACK with respect to a Physical Downlink Shared Channel (PDSCH) allocated based on the downlink scheduling information, using the uplink control channel resource starting offset indication information and a lowest index of the control channel element as components for resource determination,
    wherein:
    the downlink scheduling control information includes dynamic offset indication information; and
    the uplink control channel resource mapping is performed using the dynamic offset indication information as another component for resource determination;

wherein the X resource block pairs of the subframe are 4, 8, or 16 resource block pairs; and wherein each of the at least one downlink control channel set is configured to be one of a localized downlink control channel set and a distributed downlink control channel set;

when the downlink control channel set is configured to be the localized downlink control channel set, resource element groups forming each control channel element are located in a single physical resource block pair; and when the downlink control channel set is configured to be the distributed downlink control channel set, resource element groups forming each control channel element are located in two or more physical resource block pairs.

6. The method as claimed in claim 5, wherein:

each of the control channel elements is formed of one of 4 resource element groups and 8 resource element groups; and 4 or 8 resource element groups forming each control channel element is located in the single physical resource block pair or in the two or more physical resource block pairs.

7. The method as claimed in claim 5, wherein the receiving the uplink control channel resource starting offset indication information includes receiving the uplink control channel resource starting offset indication information through higher layer signaling.

8. The method as claimed in claim 5, wherein the uplink control channel resource mapping is performed using a transmission antenna port of the downlink scheduling control information as another component for resource determination.

9. A User Equipment (UE), comprising:

a receiver configured (i) to receive, from a transmission/reception point, uplink control channel resource starting offset indication information separately determined for each of at least one downlink control channel set allocated to the UE, wherein each of the at least one downlink control channel set is formed of X resource block pairs of a subframe, where the downlink control channel include a Physical Downlink Control Channel (PDCCH) in a data region and X is a natural number greater than or equal to 1 and less than or equal to the number of RBs in the entire band, and (ii) to receive, from a transmission/reception point, control information associated with downlink scheduling information through at least one control channel element indexed for each downlink control channel set, where the control channel element includes a control channel element in the data region; and a controller configured to perform uplink control channel resource mapping for ACK/NACK with respect to Physical Downlink Shared Channel (PDSCH) allocated based on the downlink scheduling information, using the uplink control channel resource starting offset indication information and a lowest index of the control channel element as components for resource determination, wherein:

the downlink scheduling control information includes dynamic offset indication information; and the uplink control channel resource mapping is executed using the dynamic offset indication information as another component for resource determination;

wherein the X resource block pairs of the subframe are 4, 8, or 16 resource block pairs; and wherein each of the at least one downlink control channel set is configured to be one of a localized downlink control channel set and a distributed downlink control channel set;

when the downlink control channel set is configured to be the localized downlink control channel set, resource element groups forming each control channel element are located in a single physical resource block pair; and when the downlink control channel set is configured to be the distributed downlink control channel set, resource element groups forming each control channel element are located in two or more physical resource block pairs.

10. The UE as claimed in claim 9, wherein the receiver is configured to receive the uplink control channel resource starting offset indication information through higher layer signaling.

11. The UE as claimed in claim 9, wherein the uplink control channel resource mapping is performed using a transmission antenna port of the downlink scheduling control information as another component for resource determination.

* * * * *